(12) United States Patent
Knappenberger et al.

(10) Patent No.: US 11,703,928 B2
(45) Date of Patent: *Jul. 18, 2023

(54) DIGITAL POWER SUPPLY WITH WIRELESS MONITORING AND CONTROL

(71) Applicant: Weber-Stephen Products LLC, Palatine, IL (US)

(72) Inventors: Eric Knappenberger, Chicago, IL (US); Julio C. Zuleta, Gilberts, IL (US); Matthew Lerch, Chicago, IL (US); Jeffery C. Emmerich, Delavan, WI (US)

(73) Assignee: Weber-Stephen Products LLC, Palatine, IL (US)

( * ) Notice: Subject to any disclaimer, the term of this patent is extended or adjusted under 35 U.S.C. 154(b) by 463 days.

This patent is subject to a terminal disclaimer.

(21) Appl. No.: 16/724,807

(22) Filed: Dec. 23, 2019

(65) Prior Publication Data
US 2020/0201414 A1 Jun. 25, 2020

Related U.S. Application Data

(63) Continuation of application No. 15/493,696, filed on May 5, 2017, now Pat. No. 10,551,893, which is a
(Continued)

(51) Int. Cl.
*G06F 1/3206* (2019.01)
*G06F 1/26* (2006.01)
(Continued)

(52) U.S. Cl.
CPC ........ *G06F 1/3206* (2013.01); *A47J 37/0629* (2013.01); *G06F 1/26* (2013.01);
(Continued)

(58) Field of Classification Search
CPC .. A47J 37/0709; A47J 37/0676; A47J 36/321; A47J 37/0611; A47J 37/0629;
(Continued)

(56) References Cited

U.S. PATENT DOCUMENTS 3,775,591 A 11/1973 Gould
4,219,857 A 8/1980 Haraldsson et al.
(Continued)

FOREIGN PATENT DOCUMENTS

CN 1508479 6/2004
CN 2847774 12/2006
(Continued)

OTHER PUBLICATIONS

Notice of Reason for Rejection dated May 12, 2020 in corresponding Japanese Application No. 2018-085657.
(Continued)

*Primary Examiner* — Chris Q Liu
(74) *Attorney, Agent, or Firm* — Hanley, Flight & Zimmerman, LLC

(57) ABSTRACT

Provided is an apparatus and method for a digital power supply that can provide independent power control for two or more electrical loads. Some disclosed embodiments provide continuous, variable power and other disclosed embodiments provide discrete power levels. Disclosed embodiments may reduce the magnitude of harmonic currents and/or flicker introduced into a power system. Embodiments include a microprocessor that delivers power to electric loads using phase-controlled AC current. In some embodiments, the microprocessor may calculate a power array corresponding to a requested power for each electric load. Logic is provided for populating the power array in a pattern that reduces the magnitude of harmonic currents and flicker. Portions of the disclosure include a band controller
(Continued)

for delivering power to achieve and maintain a desired target temperature, and a wireless controller for controlling temperature from a remote device.

18 Claims, 25 Drawing Sheets

Related U.S. Application Data continuation-in-part of application No. 15/200,759, filed on Jul. 1, 2016, now Pat. No. 10,537,199.

(51) Int. Cl.

| | | |
|---|---|---|
| *H04B 1/16* | (2006.01) | |
| *A47J 37/06* | (2006.01) | |
| *G06F 1/3203* | (2019.01) | |
| *H05B 1/02* | (2006.01) | |

(52) U.S. Cl.
CPC ........... *G06F 1/266* (2013.01); *H04B 1/1615* (2013.01); *G06F 1/3203* (2013.01); *H05B 1/0261* (2013.01)

(58) Field of Classification Search
CPC .. A47J 37/07; A47J 27/10; A47J 27/62; A47J 31/52; A47J 31/5253; A47J 36/32; G06F 1/20; G06F 1/26; G06F 1/266; G06F 1/3203; G06F 1/3206
USPC .... 219/481, 483, 486, 494, 497, 506, 443.1, 219/445.1, 482, 485, 213, 386, 391, 394, 219/398, 412, 413, 414, 446.1, 448.12, 219/448.13, 448.17, 450.1, 457.1, 462.1, 219/480, 487, 490, 492, 501, 508, 549, 219/647
See application file for complete search history.

(56) References Cited

U.S. PATENT DOCUMENTS

| | | | |
|---|---|---|---|
| 4,634,843 A | 1/1987 | Payne | |
| 4,780,787 A | 10/1988 | Dano et al. | |
| 5,171,973 A | 12/1992 | Higgins | |
| 5,280,422 A | 1/1994 | Moe et al. | |
| 5,302,857 A | 4/1994 | Charles et al. | |
| 5,413,032 A | 5/1995 | Bruno et al. | |
| 5,524,528 A | 6/1996 | Yeh | |
| 5,578,230 A | 11/1996 | Eldon | |
| 5,606,245 A | 2/1997 | Kirby | |
| 5,710,408 A | 1/1998 | Jones | |
| 5,719,377 A | 2/1998 | Giebel et al. | |
| 5,908,571 A | 6/1999 | Scott | |
| 5,982,593 A | 11/1999 | Kimblin et al. | |
| 5,986,242 A | 11/1999 | Maitani | |
| 5,994,671 A | 11/1999 | Suzuki et al. | |
| 6,037,571 A | 3/2000 | Christopher | |
| 6,057,997 A | 5/2000 | Mackenzie et al. | |
| 6,111,230 A | 8/2000 | Cao | |
| 6,118,106 A | 9/2000 | Scott | |
| 6,697,244 B1 | 2/2004 | Bauer et al. | |
| 6,727,475 B2 | 4/2004 | Kennard | |
| 6,849,833 B2 | 2/2005 | Harrington | |
| 6,927,368 B2 | 8/2005 | Cao | |
| 7,131,549 B2 | 11/2006 | Hook | |
| 7,312,426 B2 | 12/2007 | Han | |
| 7,342,202 B2 | 3/2008 | Bachinski | |
| 7,368,686 B2 | 5/2008 | Etheredge | |
| 7,675,007 B2 | 3/2010 | Ashton et al. | |
| 7,825,353 B2 | 11/2010 | Shingler | |
| 8,030,598 B2 | 10/2011 | Bachinski | |
| 8,097,835 B2 | 1/2012 | Hsieh | |
| 8,102,080 B2 | 1/2012 | Fonseca et al. | |
| 8,141,478 B2 | 3/2012 | Kuo | |
| 8,263,911 B2 | 9/2012 | Yen | |
| 8,624,169 B1 | 1/2014 | Sorenson et al. | |
| 8,680,440 B2 | 3/2014 | Cohen | |
| 8,927,908 B2 | 1/2015 | Wang | |
| 9,978,553 B2 | 5/2018 | Tomimbang et al. | |
| 2001/0033743 A1 | 10/2001 | Kishita | |
| 2003/0218846 A1 | 11/2003 | Telamo | |
| 2006/0043087 A1 | 3/2006 | Gagas et al. | |
| 2006/0050464 A1 | 3/2006 | Von Arx et al. | |
| 2007/0116485 A1 | 5/2007 | Nishida | |
| 2007/0145034 A1 | 6/2007 | Imura | |
| 2007/0208520 A1 | 9/2007 | Zhang et al. | |
| 2007/0262074 A1 | 11/2007 | Shearer | |
| 2008/0031302 A1 | 2/2008 | Rund et al. | |
| 2008/0036581 A1 | 2/2008 | Bunims | |
| 2008/0136581 A1 | 6/2008 | Heilman et al. | |
| 2009/0154033 A1 | 6/2009 | Tomimbang | |
| 2009/0167085 A1* | 7/2009 | Fonseca ............... H05B 1/0261 307/32 |
| 2010/0296217 A1 | 11/2010 | Darmann | |
| 2011/0132900 A1 | 6/2011 | Kinoshita et al. | |
| 2011/0160931 A1 | 6/2011 | Hsieh | |
| 2011/0284518 A1 | 11/2011 | Elston, III et al. | |
| 2013/0271886 A1 | 10/2013 | Cull et al. | |
| 2013/0334212 A1 | 12/2013 | Sawada et al. | |
| 2014/0005834 A1 | 1/2014 | Hoffman | |
| 2014/0242227 A1 | 8/2014 | Yang et al. | |
| 2015/0312964 A1 | 10/2015 | Sorenson et al. | |
| 2015/0346264 A1 | 12/2015 | Curtis | |
| 2016/0003484 A1 | 1/2016 | Span et al. | |
| 2016/0044745 A1 | 2/2016 | Nakayama | |
| 2016/0196739 A1* | 7/2016 | Naber .................... G08C 17/02 340/12.5 |
| 2016/0231721 A1 | 8/2016 | Lakshmanan et al. | |
| 2017/0020324 A1 | 1/2017 | Young et al. | |
| 2018/0000277 A1 | 1/2018 | Knappenberger et al. | |
| 2018/0004271 A1 | 1/2018 | Knappenberger et al. | |
| 2018/0007738 A1 | 1/2018 | Knappenberger et al. | |
| 2018/0007739 A1 | 1/2018 | Knappenberger et al. | |
| 2020/0084837 A1 | 3/2020 | Knappenberger et al. | |
| 2020/0100615 A1 | 4/2020 | Knappenberger et al. | |
| 2020/0201414 A1 | 6/2020 | Knappenberger et al. | |

FOREIGN PATENT DOCUMENTS

| | | |
|---|---|---|
| CN | 101277558 | 10/2008 |
| CN | 101577191 | 11/2009 |
| CN | 201434433 | 3/2010 |
| CN | 102193443 A | 9/2011 |
| CN | 202817705 | 3/2013 |
| CN | 103142147 | 6/2013 |
| CN | 103263224 | 8/2013 |
| CN | 203167321 | 8/2013 |
| CN | 203238304 | 10/2013 |
| CN | 103416104 A | 11/2013 |
| CN | 103645730 | 3/2014 |
| CN | 103926970 | 7/2014 |
| CN | 103926970 A | 7/2014 |
| CN | 203785271 U | 8/2014 |
| CN | 104065699 | 9/2014 |
| CN | 204595584 | 8/2015 |
| CN | 106162976 | 11/2016 |
| CN | 106211395 | 12/2016 |
| DE | 19842470 | 3/2000 |
| EP | 230246 | 7/1987 |
| EP | 258091 | 3/1988 |
| EP | 615327 | 9/1994 |
| EP | 0804049 A2 | 10/1997 |
| EP | 906000 | 3/1999 |
| EP | 1854719 | 11/2007 |
| EP | 2214458 A1 | 8/2010 |
| GB | 2067857 A | 7/1981 |
| GB | 2239138 | 6/1991 |
| GB | 2252647 | 8/1992 |
| GB | 2329769 | 3/1999 |
| GB | 2339348 A | 1/2000 |
| GB | 2508198 | 5/2014 |
| GB | 2508198 A | 5/2014 |
| JP | S53-050152 | 5/1978 |

(56) References Cited

FOREIGN PATENT DOCUMENTS

| | | |
|---|---|---|
| JP | S54149042 | 11/1979 |
| JP | S56140422 A | 11/1981 |
| JP | S57-011618 | 1/1982 |
| JP | S60129813 A | 7/1985 |
| JP | S6129916 A | 2/1986 |
| JP | S61128033 | 8/1986 |
| JP | S62-010513 | 1/1987 |
| JP | S62-073584 | 5/1987 |
| JP | S62-178821 | 11/1987 |
| JP | S63-049634 | 4/1988 |
| JP | S63107412 | 7/1988 |
| JP | H02246769 A | 10/1990 |
| JP | H3251618 | 11/1991 |
| JP | H03251618 A | 11/1991 |
| JP | H4-73523 A | 3/1992 |
| JP | H04-073523 | 6/1992 |
| JP | H04-249088 | 9/1992 |
| JP | H4-336608 A | 11/1992 |
| JP | H06-141003 | 5/1994 |
| JP | H07-078668 | 3/1995 |
| JP | H7123504 | 5/1995 |
| JP | H0960888 A | 3/1997 |
| JP | H9-182278 | 7/1997 |
| JP | H09-258599 | 10/1997 |
| JP | H10-10917 A | 1/1998 |
| JP | H11-018281 | 1/1999 |
| JP | H11-185953 | 7/1999 |
| JP | 2001308572 | 11/2001 |
| JP | 2002095586 | 4/2002 |
| JP | 2003014241 | 1/2003 |
| JP | 2003086347 | 3/2003 |
| JP | 2003151759 | 5/2003 |
| JP | 2004-164431 A | 6/2004 |
| JP | 2004212601 | 7/2004 |
| JP | 2005034379 | 2/2005 |
| JP | 2005085514 A | 3/2005 |
| JP | 2005195640 | 7/2005 |
| JP | 2005221086 | 8/2005 |
| JP | 2006340469 | 12/2006 |
| JP | 2008512979 | 4/2008 |
| JP | 2008175437 | 7/2008 |
| JP | 2008180472 | 8/2008 |
| JP | 2008183763 | 8/2008 |
| JP | 2008223320 | 9/2008 |
| JP | 2008300171 | 12/2008 |
| JP | 2009510667 | 3/2009 |
| JP | 2009296802 | 12/2009 |
| JP | 2010515976 | 5/2010 |
| JP | 2010181044 | 8/2010 |
| JP | 2011067311 | 4/2011 |
| JP | 2011096484 | 5/2011 |
| JP | 2012-242779 A | 12/2012 |
| JP | 2012252851 | 12/2012 |
| JP | 2013518556 | 5/2013 |
| JP | 2014-114967 A | 6/2014 |
| JP | 2014190626 | 10/2014 |
| JP | 2015047389 | 3/2015 |
| JP | 2015172447 | 10/2015 |
| JP | 2015190643 | 11/2015 |
| JP | 2016151383 | 8/2016 |
| JP | 2018007549 | 1/2018 |
| WO | 2014079493 A1 | 5/2014 |
| WO | 2014079735 | 5/2014 |
| WO | 20150115663 | 8/2015 |
| WO | 20150138985 | 9/2015 |
| WO | 2016105551 | 6/2016 |

OTHER PUBLICATIONS

Chinese Patent Office, "Decision on the Re-examination," issued in connection with Chinese Patent Application No. 201810418245.4, dated Mar. 14, 2022, 1 page.

Japanese Patent Office, "Decision to Grant a Patent," issued in connection with Japanese Patent Application No. 2019-224437, dated Mar. 7, 2022, 5 pages (English translation provided).

IP Australia, "Notice of acceptance," issued in connection with Australian Patent Application No. 2020260545, dated Mar. 24, 2022, 3 pages.

IP Australia, "Notice of Acceptance," issued in connection with Australian Patent Application No. 2021200734, dated Mar. 29, 2022, 3 pages.

China National Intellectual Property Administration, "First Office Action," issued in connection with Chinese Patent Application No. 202010985725.6, dated Mar. 2, 2022, 19 pages (English translation provided).

European Patent Office, "Extended European Search Report," issued in connection with European Patent Application No. 21191918.8, dated Jan. 7, 2022, 8 pages.

U.S. Appl. No. 10/524,312, filed Dec. 31, 2019, Knappenberger et al.

U.S. Appl. No. 10/537,199, filed Jan. 21, 2020, Knappenberger et al.

U.S. Appl. No. 10/551,893, filed Feb. 4, 2020, Knappenberger et al.

European Patent Office, "Partial European Search Report", dated Dec. 6, 2017, in corresponding European Application 17179223.7, 10 pages.

European Patent Office, "Extended European Search Report", dated Mar. 27, 2018, in corresponding European Application 17179223.7, 12 pages.

Japanese Patent Office, "Official Action," dated Jul. 31, 2018 in corresponding Japanese Patent Application 2017-128811, 21 pages.

European Patent Office, "Extended European Search Report," dated Sep. 12, 2018 in corresponding European Patent Application No. 18169824.2, 8 pages.

Chinese Patent Office, "First Office Action and Search Report," dated Oct. 9, 2018 in corresponding Chinese Application No. 201710521319.2 3 pages.

Australian Patent Office, "Notice of Acceptance for patent application," dated Nov. 29, 2018 in corresponding Australian Application No. 2017204387, 3 pages.

Japanese Patent Office, "Search Report," dated Mar. 19, 2019 in corresponding Japanese Application No. 2018-085656, 102 pages.

Chinese Patent Office, "Office Action," dated Apr. 22, 2019 in corresponding Chinese Application No. 201810415364.4, 18 pages.

Chinese Patent Office, "Third Office Action," dated Mar. 16, 2020, in corresponding Chinese Application No. 201810415364.4, 19 pages.

United States Patent and Trademark Office, "Final Office Action," issued in connection with U.S. Appl. No. 15/493,611, dated Oct. 16, 2020, 14 pages.

United States Patent and Trademark Office, "Non-Final Office Action," issued in connection with U.S. Appl. No. 15/493,611, dated Apr. 19, 2021, 14 pages.

United States Patent and Trademark Office, "Requirement for Restriction," issued in connection with U.S. Appl. No. 15/493,696, dated Feb. 13, 2019, 6 pages.

United States Patent and Trademark Office, "Non-Final Office Action," issued in connection with U.S. Appl. No. 15/493,696, dated May 7, 2019, 7 pages.

United States Patent and Trademark Office, "Notice of Allowance," issued in connection with U.S. Appl. No. 15/493,696, dated Sep. 24, 2019, 7 pages.

United States Patent and Trademark Office, "Supplemental Notice of Allowance," issued in connection with U.S. Appl. No. 15/493,696, dated Nov. 29, 2019, 2 pages.

United States Patent and Trademark Office, "Non-Final Office Action," issued in connection with U.S. Appl. No. 15/200,687, dated Oct. 12, 2018, 9 pages.

United States Patent and Trademark Office, "Final Office Action," issued in connection with U.S. Appl. No. 15/200,687, dated Mar. 29, 2019, 10 pages.

United States Patent and Trademark Office, "Notice of Allowance," issued in connection with U.S. Appl. No. 15/200,687, dated Aug. 19, 2019, 7 pages.

Australian Patent Office, "Examination Report No. 1," issued in connection with Australian Application No. 2019203341, dated Apr. 29, 2020, 5 pages.

(56) References Cited

OTHER PUBLICATIONS

United States Patent and Trademark Office, "Final Office Action," issued in connection with U.S. Appl. No. 15/493,611, dated Aug. 11, 2021, 14 pages.
Chinese Patent Office, "Second Office Action," issued in connection with Chinese Application No. 201810418245.4, dated Jul. 2, 2020, 21 pages.
Australian Patent Office, "Examination Report No. 1," issued in connection with Australian Patent Application No. 2019201672, dated Jan. 14, 2020, 2 pages.
Australian Patent Office, "Notice of Acceptance," issued in connection with Australian Patent Application No. 2019201672, dated May 20, 2020, 3 pages.
Australian Patent Office, "Examination Report No. 1," issued in connection with Australian Patent Application No. 2020202616, dated Apr. 29, 2021, 6 pages.
Australian Patent Office, "Examination Report No. 2," issued in connection with Australian Patent Application No. 2020202616, dated Sep. 21, 2021, 3 pages.
Canadian Patent Office, "Examiner Requisition" issued in connection with Canadian Patent Application No. 2971815, dated Jul. 19, 2018, 4 pages.
Canadian Patent Office, "Examiner Requisition" issued in connection with Canadian Patent Application No. 2971815, dated Feb. 17, 2020, 3 pages.
Australian Patent Office, "Examination Report No. 1," issued in connection with Australian Patent Application No. 2018202492, dated Apr. 5, 2019, 3 pages.
Australian Patent Office, "Examination Report No. 2," issued in connection with Australian Patent Application No. 2018202492, dated Aug. 26, 2019, 2 pages.
Australian Patent Office, "Notice of Acceptance," issued in connection with Australian Patent Application No. 2018202492, dated Oct. 24, 2019, 3 pages.
Australian Patent Office, "Examination Report No. 1," issued in connection with Australian Patent Application No. 2020200829, dated Feb. 10, 2021, 7 pages.
Australian Patent Office, "Notice of Acceptance," issued in connection with Australian Patent Application No. 2020200829, dated Jun. 23, 2021, 3 pages.
Canadian Patent Office, "Office Action," issued in connection with Canadian Patent Application No. 3000527, dated Mar. 11, 2019, 3 pages.
Canadian Patent Office, "Office Action," issued in connection with Canadian Patent Application No. 3000527, dated Nov. 20, 2019, 4 pages.
Canadian Patent Office, "Office Action," issued in connection with Canadian Patent Application No. 3094309, dated Sep. 23, 2021, 4 pages.
Chinese Patent Office, "Second Office Action," issued in connection with Chinese Patent Application No. 201810415364.4, dated Sep. 20, 2019, 7 pages (English translation provided).
Chinese Patent Office, "Notification to Grant Patent Right for Invention," issued in connection with Chinese Patent Application No. 201810415364.4, dated Jul. 6, 2020, 3 pages (English translation provided).
European Patent Office, "Intention to Grant," issued in connection with European Patent Application No. 18169824.2, dated Apr. 29, 2021, 8 pages.
Japanese Patent Office, "Search Report," issued in connection with Japanese Patent Application No. 2018-085656, dated Mar. 14, 2019, 102 pages (English translation provided).
Japanese Patent Office, "Decision to Grant a Patent," issued in connection with Japanese Patent Application No. 2018-085656, dated Nov. 12, 2019, 5 pages (English translation provided).
Japanese Patent Office, "Search Report," issued in connection with Japanese Patent Application No. 2019-224437, dated Dec. 7, 2020, 72 pages (English translation provided).
Chinese Patent Office, "Second Office Action," issued in connection with Chinese Patent Application No. 201710521319.2, dated Jun. 28, 2019, 7 pages (English translation provided).
Chinese Patent Office, "Notification to Grant Patent Right for Invention," issued in connection with Chinese Patent Application No. 201710521319.2, dated Oct. 9, 2019, 3 pages (English translation provided).
Chinese Patent Office, "First Office Action," issued in connection with Chinese Patent Application No. 201911342769.0, dated May 27, 2021, 33 pages (English translation provided).
Japanese Patent Office, "Search Report," issued in connection with Japanese Patent Application No. 2017-128811, dated Jun. 11, 2018, 15 pages (English translation provided).
Japanese Patent Office, "Decision to Grant a Patent," issued in connection with Japanese Patent Application No. 2017-128811, dated Jul. 2, 2019, 5 pages (English translation provided).
Japanese Patent Office, "Search Report," issued in connection with Japanese Patent Application No. 2019-142088, dated Oct. 12, 2020, 18 pages (English translation provided).
Japanese Patent Office, "Office Action," issued in connection with Japanese Patent Application No. 2019-142088, dated Oct. 27, 2020, 11 pages (English translation provided).
Japanese Patent Office, "Office Action," issued in connection with Japanese Patent Application No. 2019-142088, dated Jun. 22, 2021, 4 pages (English translation provided).
Australian Patent Office, "Examination Report No. 2," issued in connection with Australian Patent Application No. 2017204389, dated Jun. 13, 2018, 3 pages.
Australian Patent Office, "Examination Report No. 3," issued in connection with Australian Patent Application No. 2017204389, dated Oct. 26, 2018, 4 pages.
Australian Patent Office, "Notice of Acceptance," issued in connection with Australian Patent Application No. 2017204389, dated Feb. 1, 2019, 3 pages.
Australian Patent Office, "Notice of Acceptance," issued in connection with Australian Patent Application No. 2019203341, dated Aug. 17, 2020, 3 pages.
Australian Patent Office, "Examination Report No. 1," issued in connection with Australian Patent Application No. 2020260545, dated Oct. 29, 2021, 5 pages.
Canadian Patent Office, "Office Action," issued in connection with Canadian Patent Application No. 2971814, dated Jun. 19, 2018, 3 pages.
Canadian Patent Office, "Office Action," issued in connection with Canadian Patent Application No. 2971814, dated Jun. 19, 2019, 3 pages.
Canadian Patent Office, "Office Action," issued in connection with Canadian Patent Application No. 2971814, dated Sep. 3, 2020, 11 pages.
Canadian Patent Office, "Notice of Allowance," issued in connection with Canadian Patent Application No. 2971814, dated Jul. 14, 2021, 7 pages.
Australian Patent Office, "Notice of Acceptance," issued in connection with Australian Application No. 2018202490, dated Feb. 21, 2019, 3 pages.
Australian Patent Office, "Examination Report No. 1," issued in connection with Australian Patent Application No. 2019203941, dated Jun. 18, 2020, 4 pages.
Australian Patent Office, "Notice of Acceptance," issued in connection with Australian Patent Application No. 2019203941, dated Oct. 31, 2020, 3 pages.
Australian Patent Office, "Examination Report No. 1," issued in connection with Australian Patent Application No. 2021200734, dated Oct. 29, 2021, 6 pages.
Canadian Patent Office, "Notice of Allowance," issued in connection with Canadian Patent Application No. 300542, dated May 10, 2021, 6 pages.
Chinese Patent Office, "First Office Action," issued in connection with Chinese Patent Application No. 201810418245.4, dated Sep. 20, 2019, 20 pages (English translation provided).
Chinese Patent Office, "Third Office Action," issued in connection with Chinese Patent Application No. 201810418245.4, dated Mar. 1, 2021, 26 pages (English translation provided).

(56) References Cited

OTHER PUBLICATIONS

Chinese Patent Office, "Fourth Office Action," issued in connection with Chinese Patent Application No. 201810418245.4, dated Jun. 30, 2021, 21 pages (English translation provided).
European Patent Office, "Examination Report," issued in connection with European Patent Application No. 18169911.7, dated Dec. 4, 2020, 5 pages.
Japanese Patent Office, "Search Report," issued in connection with Japanese Patent Application No. 2018-085657, dated Jun. 19, 2019, 32 pages (English translation provided).
Japanese Patent Office, "Decision to Grant a Patent," issued in connection with Japanese Patent Application No. 2018-085657, dated Jan. 12, 2021, 5 pages (English translation provided).
Chinese Patent Office, "Third Office Action," issued in connection with Chinese Patent Application No. 201710521776.1, dated Sep. 18, 2019, 8 pages (English translation provided).
Chinese Patent Office, "Notification to Grant Patent Right for Invention," issued in connection with Chinese Patent Application No. 201710521776.1, dated Mar. 4, 2020, 3 pages (English translation provided).
Chinese Patent Office, "First Office Action," issued in connection with Chinese Patent Application No. 202010379486.X, dated Jul. 5, 2021, 11 pages (English translation provided).
European Patent Office, "Examination Report," issued in connection with European Patent Application No. 17179224.5, dated Oct. 23, 2020, 4 pages.
Japanese Patent Office, "Search Report," issued in connection with Japanese Patent Application No. 2017-128814, dated May 23, 2018, 59 pages (English translation provided).
Japanese Patent Office, "Decision to Grant a Patent," issued in connection with Japanese Patent Application No. 2017-128814, dated Oct. 23, 2018, 5 pages (English translation provided).
Japanese Patent Office, "Search Report," issued in connection with Japanese Patent Application No. 2018-154680, dated Jun. 19, 2019, 30 pages (English translation provided).
Japanese Patent Office, "Decision to Grant a Patent," issued in connection with Japanese Patent Application No. 2018-154680, dated Oct. 15, 2019, 5 pages (English translation provided).
Japanese Patent Office, "Office Action," issued in connection with Japanese Patent Application No. 2019-206237, dated Oct. 6, 2020, 15 pages (English translation provided).
Japanese Patent Office, "Office Action," issued in connection with Japanese Patent Application No. 2019-206237, dated Jan. 19, 2021, 6 pages (English translation provided).
Japanese Patent Office, "Decision to Grant a Patent," issued in connection with Japanese Patent Application No. 2019-206237, dated Apr. 27, 2021, 5 pages (English translation provided).
United States Patent and Trademark Office, "Non-Final Office Action," issued in connection with U.S. Appl. No. 16/688,354, dated Aug. 11, 2021, 13 pages.
United States Patent and Trademark Office, "Non-Final Office Action," issued in connection with U.S. Appl. No. 15/493,611, dated Jul. 30, 2019, 12 pages.
United States Patent and Trademark Office, "Final Office Action", issued in connection with U.S. Appl. No. 15/493,611, dated Dec. 31, 2019, 13 pages.
United States Patent and Trademark Office, "Non-Final Office Action," issued in connection with U.S. Appl. No. 15/493,611, dated Jun. 1, 2020, 13 pages.
Chinese Patent Office, "Second Office Action," issued in connection with Chinese Patent Application No. 202010379486.X, dated Jan. 11, 2022, 5 pages.
China National Intellectual Property Administration, "Notification to Grant Patent Right for Invention," issued in connection with Chinese Patent Application No. 2019113427690, dated Jan. 18, 2022, 4 pages.
European Patent Office, "Examination Report," issued in connection with European Patent Application No. 18169911.7, dated Feb. 1, 2022, 6 pages.
United States Patent and Trademark Office, "Notice of Allowance," issued in connection with U.S. Appl. No. 15/493,611, dated Feb. 7, 2022, 5 pages.
European Patent Office, "Examination Report," issued in connection with European Patent Application No. 17179223.7, dated Feb. 11, 2022, 5 pages.
United States Patent and Trademark Office, "Corrected Notice of Allowance," issued in connection with U.S. Appl. No. 15/493,611, dated Feb. 15, 2022, 2 pages.
European Patent Office, "Notice of Intention to Grant," issued in connection with European Patent Application No. 17179224.5, dated Feb. 28, 2022, 7 pages.
Second Office Action dated Jul. 2, 2020 in corresponding Chinese Application No. 201810418245.4.
Japanese Patent Office, "Decision to Grant a Patent," issued in connection with Japanese Patent Application No. 2019-142088, dated Nov. 16, 2021, 4 pages.
Japanese Patent Office, "Notice of Reasons for Refusal," issued in connection with Japanese Patent Application No. 2019-224437, dated Nov. 30, 2021, 12 pages.
Australian Patent Office, "Notice of Acceptance for patent application," issued in connection with Australian Patent Application No. 2020202616, dated Dec. 1, 2021, 3 pages.
Chinese Patent Office, "Fifth Office Action," issued in connection with Chinese Patent Application No. 201810418245.4, dated Nov. 3, 2021, 7 pages.
United States Patent and Trademark Office, "Final Office Action," issued in connection with U.S. Appl. No. 16/688,354, dated Jan. 7, 2022, 13 pages.
United States Patent and Trademark Office, "Notice of Allowance and Fee(s) Due," issued in connection with U.S. Appl. No. 15/493,611, dated May 25, 2022, 5 pages.
United States Patent and Trademark Office, "Requirement for Restriction," issued in connection with U.S. Appl. No. 16/688,287, dated May 27, 2022, 5 pages.
United States Patent and Trademark Office, "Corrected Notice of Allowance," issued in connection with U.S. Appl. No. 15/493,611, dated Jul. 5, 2022, 2 pages.
United States Patent and Trademark Office, "Non-Final Office Action," issued in connection with U.S. Appl. No. 16/688,354, dated Jul. 6, 2022, 9 pages.
European Patent Office, "Decision to Grant," issued in connection with European Patent Application No. 17179224.5, dated Jul. 28, 2022, 2 pages.
United States Patent and Trademark Office, "Corrected Notice of Allowance," issued in connection with U.S. Appl. No. 15/493,611, dated Aug. 9, 2022, 2 pages.
China National Intellectual Property Administration, "Second Office Action," issued in connection with Chinese Patent Application No. 202010985725.6, dated Sep. 20, 2022, 11 pages.
European Patent Office, "Invitation pursuant to Rule 63(1) EPC," issued in connection with European Patent Application No. 22180377.8, dated Oct. 6, 2022, 3 pages.
Canadian Intellectual Property Office, "Office Action," issued in connection with Canadian Patent Application No. 3129669, dated Oct. 11, 2022, 5 pages.
Canadian Intellectual Property Office, "Notice of Allowance," issued in connection with Canadian Patent Application No. 3094309, dated Apr. 28, 2022, 1 page.
China National Intellectual Property Administration, "Notification to Grant Patent Right for Invention," issued in connection with Chinese Patent Application No. 202010379486.x, dated May 11, 2022, 6 pages.
China National Intellectual Property Administration, "Notification to Grant Patent Right for Invention," issued in connection with Chinese Patent Application No. 201810418245.4, dated May 19, 2022, 6 pages.
IP Australia, "Examination Report No. 1," issued in connection with Australian Patent Application No. 2021212146, dated Jun. 10, 2022, 3 pages.
Japanese Patent Office, "Decision to Grant Patent," issued in connection with Japanese Patent Application No. 2021-019730, dated Jun. 20, 2022, 4 pages (English translation included).

(56) References Cited

OTHER PUBLICATIONS

Kenyon City Grill Owners Manual Mar. 28, 2011.
STOK Operator's Manual Electric Gridiron Grill STE1150Q Jan. 22, 2014.
Dimplex North America Ltd. Power Chef Electric Grill TBQ-120 Owner's Manual 2010.
Extended European Search Report dated Feb. 9, 2018 in corresponding European Application No. 17179224.5.
Examination Report No. 1 dated Feb. 27, 2018 in corresponding Australian Application No. 2017204389.
First Office Action and Search Report dated Jun. 5, 2018 in corresponding Chinese Application No. 201710521776.1.
First Office Action dated Jun. 5, 2018 in corresponding Japanese Application No. 2017-128814.
Extended European Search Report dated Oct. 4, 2018 in corresponding European Application No. 18169911.7.
Examination Report No. 1 dated Oct. 2, 2018 in corresponding Australian Application No. 2018202490.
Office Action dated Jun. 25, 2019 in corresponding Japanese Application No. 2018-085657.
Office Action dated Jun. 25, 2019 in corresponding Japanese Application No. 2018-154680.
Office Action dated Sep. 20, 2019 in corresponding Chinese Application No. 201810418245.4.
Examination Report No. 1, dated Apr. 29, 2020 in corresponding Australian Application No. 2019203341.
European Patent Office, "Extended European Search Report," issued in connection with European Patent Application No. 22180377.8, dated Jan. 25, 2023, 7 pages.
China National Intellectual Property Administration, "Third Office Action," issued in connection with Chinese Patent Application No. 202010985725.6, dated Jan. 20, 2023, 8 pages.
United States Patent and Trademark Office, "Corrected Notice of Allowabilty," issued in connection with U.S. Appl. No. 16/688,354, dated Mar. 7, 2023, 2 pages.
United States Patent and Trademark Office, "Non-Final Office Action," issued in connection with U.S. Appl. No. 17/895,806, dated May 22, 2023, 7 pages.
China National Intellectual Property Administration, "Decision of Final Rejection," issued in connection with Chinese Patent Application No. 202010985725.6, dated Apr. 29, 2023, 14 pages.

\* cited by examiner

DIGITAL POWER SUPPLY WITH WIRELESS MONITORING AND CONTROL

RELATED APPLICATIONS

This patent application is a continuation of U.S. patent application Ser. No. 15/493,696, filed on May 5, 2017, which issued as U.S. Pat. No. 10,551,893 on Feb. 4, 2020, which is a continuation-in-part of U.S. patent application Ser. No. 15/200,759, filed on Jul. 1, 2016, which issued as U.S. Pat. No. 10,537,199 on Jan. 21, 2020. These disclosures are hereby expressly incorporated, in their entirety, by reference as part of the present disclosure as if fully set forth herein.

FIELD OF THE INVENTION

The present inventions relate to a digital power supply for independently controlling two or more high-powered loads with reduced harmonic and flicker introduction. In a non-limiting embodiment, a digital power supply may be used in an electric grill to independently control two or more heating elements while reducing harmonics and flicker introduced to the power system. The digital power supply may transmit operational parameters and receive control signals wirelessly, from a remote device. Moreover, the digital power supply may include functionality for heating a heating element to a desired target temperature, and maintaining that temperature for a duration.

BACKGROUND OF THE INVENTIONS

There is an increasing desire for a power supply that can independently control two or more high-powered loads using an AC wall outlet while introducing a reduced amount of harmonics and/or flicker into the power grid. The urban population is increasing, and with it there is an increasing desire for high powered loads that can be plugged into an AC wall outlet. By way of example, urban dwellers live in apartment or condominium buildings where they would like to use a grill. Because of smoke, gas, or other concerns, use of typical charcoal or gas grills may not be permitted or desirable.

There are a number of available electric cooking devices, such as the George Foreman Plate Grill (and similar devices), Panini presses, electric griddles and the like. However, these prior art devices generally do not deliver variable power. Moreover, these prior art electric cooking devices typically cannot generate enough power to match a gas or electric grill.

Some prior art devices may use variable resistors in series with electric loads to control an amount of power delivered to the load. For example, as the resistance of a variable resistor increases, the variable resistor restricts power from being delivered to an electric load. The use of variable resistors to control power delivery to electric loads is well known. But variable resistors come with disadvantages. For example, disadvantages may include the introduction of harmonics onto the electrical system, which translates to electromagnetic emissions that can create interference and other unpredictable electromagnetic fields. Moreover, variable resistors may be inefficient because they burn a lot of power.

Other prior art devices may use a bi-metal thermometer which opens and closes to control power delivery. Disadvantages of using a bi-metal thermometer include the fact that it allows for less discrete (i.e., less precise) control over power delivered and is usually associated with a relatively long lag in response time. A long lag time causes a negative cooking experience because it leads to poor control over temperature. Moreover, a long lag time is disadvantageous because long on/off duty cycles are known to shorten the life span of a heating element Some devices may use half-wave control techniques to deliver power. For example, U.S. Pat. No. 6,772,475, titled "Heating Control System Which Minimizes AC Power Line Voltage Fluctuations," discloses half wave AC control devices to control delivery of AC current. This control method is associated with significant disadvantages because it delivers power only in stages, not in a continuous range from 0-100%. By contrast, embodiments of the present invention allow continuous variable power delivery.

Yet other prior art devices may include a digital control for limiting the in-rush of electric current when an electric load in turned on. For example, U.S. Pat. No. 6,111,230, titled "Method and apparatus for supplying AC power while meeting the European flicker and harmonic requirements," describes a method for limiting the in-rush of current to a printing device when it is first turned on. However, the disclosed devices do not provide for independently controlling multiple electric loads, much less for reducing harmonic currents and flicker while independently controlling multiple loads.

Thus, there is a need for a digital power supply that can independently control two or more electric loads while introducing only reduced harmonic and flicker interference to the power system. Further, there is a need for embodiments in which one or more electric loads can be controlled wirelessly, with reduced harmonic and flicker interference. It would be advantageous for such wireless control to include a remote device which can monitor operational parameters and control the digital power supply wirelessly.

BRIEF SUMMARY OF THE INVENTIONS

The present inventions overcome many of the deficiencies of known power supplies and provide new features and advantages for devices such as electric grills. For example, embodiments of the present invention provide digital power controls that can deliver more precise amounts of power to electric loads. Moreover, embodiments of the present invention allow a plurality of electric loads to be controlled independently. Yet further embodiments of the present invention reduce the harmonic currents and flicker that may result from plugging a power supply into a wall outlet. Additional embodiments provide for the wireless control of electric loads while reducing harmonic and flicker interference.

In accordance with a preferred embodiment of the present invention, a digital power supply is provided, comprising: a first and second load connected respectively through a first and second triac to a voltage line; and a microprocessor in electronic communication with the first and second triac; wherein the microprocessor is configured to deliver discrete power levels to the first and second load by activating and deactivating the first and second triac, respectively. The digital power supply may include a wireless controller in electronic communication with the microprocessor. Moreover, the microprocessor may receive at least one desired target temperature. The desired target temperature may be received wirelessly, via the wireless controller, from a remote device. The desired target temperature may be received via a user input device in electronic communication with the microprocessor.

In embodiments of the invention, the microprocessor receives a first desired target temperature corresponding to the first load and a second desired target temperature corresponding to the second load. Furthermore, the digital power supply may comprise at least one thermocouple in electronic communication with the microprocessor. Optionally, a first thermocouple is positioned proximate to the first load and a second thermocouple is positioned proximate to the second load. The discrete power levels may be 0%, 50%, and 100%. Moreover, the microprocessor may be configured to simultaneously deliver 100% power to the first load until the first desired target temperature is reached and 100% power to the second load until the second desired target temperature is reached.

Other embodiments provide an electric grill having a digital power supply, comprising: at least one heating element connected through a triac to a voltage line; a microprocessor in electronic communication with the triac; wherein the microprocessor is configured to deliver discrete power levels to the heating element by activating or deactivating the triac; at least one temperature sensing device for measuring the temperature at a position in the electric grill, the temperature sensing device being in electronic communication with the microprocessor; and a band controller configured to receive a desired target temperature and determine an upper temperature band and a lower temperature band based on the desired target temperature. The discrete power levels may be 0%, 50%, and 100%.

Optionally, the microprocessor is adapted and configured to continuously monitor the temperature received from the temperature sensing device, and wherein the microprocessor is further adapted and configured to deliver 100% power to the heating element until the lower temperature band is reached. The microprocessor can be further adapted and configured to deliver 50% power to the heating element until the upper temperature band is reached, and wherein the microprocessor may deliver 50% power by alternately blocking and allowing a wave of ac current to pass to the heating element. The microprocessor can be further adapted and configured to deliver 0% power to the heating element when the upper temperature band is reached. Moreover, the band controller may be adapted and configured to dynamically lower the temperature bands for a lower desired target temperature and raise the temperature bands for a higher desired target temperature.

For example, a desired target temperature of 250 F may have a lower temperature band of 25 F below the desired target temperature and an upper temperature band equal to the desired target temperature. A desired target temperature between 250 F and 400 F may have a lower temperature band of 10 F below the desired target temperature and an upper temperature band of 10 F above the desired target temperature. A desired target temperature above 400 F may have a lower temperature band equal to the desired target temperature and an upper temperature band of 15 F above the desired target temperature.

Additional embodiments provide a wireless electric grill system, comprising: an electric grill having at least one heating element connected through a triac to a voltage line; a microprocessor in electronic communication with the triac; wherein the microprocessor is configured to deliver discrete power levels to the heating element by activating or deactivating the triac; at least one thermocouple for measuring the temperature at a position in the electric grill, the thermocouple being in electronic communication with the microprocessor; and a wireless controller in electronic communication with the microprocessor. The system may further include a remote device having a screen and a user input device, the remote device being in wireless communication with the electric grill via the electric grill's wireless controller. In some embodiments, the remote device displays, to a user, a menu of food profiles and receives from the user, via the user input device, a selected food profile.

In some embodiments, the remote device determines a target temperature associated with the selected food profile and wirelessly communicates the target temperature to the electric grill. The microprocessor may be adapted and configured to deliver a first discrete power level to the heating element until the lower temperature band is reached. The microprocessor can be further adapted and configured to deliver a second discrete power level to the heating element once the lower temperature band is reached. The microprocessor can be further adapted and configured to deliver a third discrete power level to the heating element once the upper temperature band is exceeded. For example, in some embodiments, the first discrete power level is 100%, the second discrete power level is 50%, and the third discrete power level is 0%. In some embodiments the discrete power level of 50% is achieve by allowing every second wave of an AC current to pass to the heating element.

Moreover, the remote device can be configured to send an "off" signal to the electric grill in response to a user input via the user input device, and the microprocessor is configured to deliver 0% power in response to the "off" signal. Optionally, the microprocessor is adapted and configured to calculate an estimated ambient temperature based on a temperature at the thermocouple, and wherein the microprocessor is further adapted and configured to compare the estimated ambient temperature to the target temperature. Embodiments of the invention may further comprise a latch relay configured in parallel with the triac and in communication with the microprocessor. The microprocessor may be adapted and configured to deliver 100% power to the heating element by activating the latch relay and deactivating the triac.

Accordingly, it is an object of the present invention to provide a digital power supply that provides precise power control, may independently control multiple loads, and may reduce harmonic currents and flicker introduced by the power supply into a wall outlet.

Another object of the invention is to provide an improved power supply, including but not limited to one that may be used with an electric grill.

It is an additional object of the invention to provide a digital power supply that can be used in an electric grill to provide independent control over two or more heating elements.

It is an additional object of the invention to provide a digital power supply that introduces fewer harmonic currents into a wall outlet.

It is an additional object of the invention to provide a digital power supply that introduces less flicker into a wall outlet.

It is an additional object of the invention to provide a digital power supply for use in an electric grill that complies with standard limits and/or regulations on harmonic currents and flicker.

It is an additional object of the invention to provide a digital power supply for use in an electric grill to deliver variable power to two or more heating elements.

It is an additional object of the invention to provide a digital power supply that uses phase cutting techniques to deliver variable power.

It is an additional object of the invention to provide a digital power supply that delivers discrete power levels.

It is an additional object of the invention to improve a heating element's life span by providing short duty cycles.

It is an additional object of the invention to provide a technique for achieving and maintaining a desired target temperature.

It is an additional object of the invention to provide a power supply in an electric grill with wireless capabilities for remotely monitoring operational parameters, as well as controlling power levels wirelessly.

Inventors' Definition of Terms

The following terms which may be used in the various claims or specification of this patent are intended to have their broadest meaning consistent with the requirement of law:

As used herein, a "power array" is defined to be an array of values, each value representing a percentage ($0.0 \leq x \leq 1.0$) of power delivery in one wave cycle. Exemplary power arrays are described as having four cells, but it will be understood that arrays of other sizes are possible.

As used herein, a "phase angle array" is defined to be an array of values, each value representing the phase angle "cut" in one wave cycle. Exemplary phase angle arrays have four cells, but it will be understood that arrays of other sizes are possible.

As used herein, a "timing pattern" is defined to be a pattern of "on" and "off" signals that create phase-controlled AC wave forms.

Where alternative meanings are possible, in either the specifications of claims, the broadest meaning is intended consistent with the understanding of a person of ordinary skill in the art. All of the words used in the claims are intended to the use in the normal, customary usage of grammar, the trade and the English language.

BRIEF DESCRIPTION OF THE DRAWINGS

The stated and unstated features, objects and advantages of the present invention (sometimes used in the singular, but not excluding the plural) will become apparent from the following description and drawings, wherein the like reference numerals represent like elements in the various views and in which.

DETAILED DESCRIPTION OF THE PREFERRED EMBODIMENTS

Set forth below is a description of what is currently believed to be the preferred embodiments or best representative examples of the inventions claimed. Future and present representative or modifications to the embodiments and preferred embodiments are contemplated. Any alterations or modifications which make insubstantial changes in function, purpose, structure or result are intended to be covered by the claims of this patent. The present inventions may be used on and/or part of electric grills with current protection circuitry as discussed in the co-pending patent application entitled "Electric Grill With Current Protection Circuitry" filed by Applicants and having application Ser. No. 15/200,687, and also the co-pending patent application entitled "Wireless Control And Monitoring For Electric Grill With Current Protection Circuitry," filed on the same day as this application, both of which are assigned to Weber-Stephen Products LLC, and which are both incorporated herein by reference in their entirety.

The present inventions generally include a digital power supply that can provide independent power control, and continuous variable power, for two or more electrical loads. Embodiments of the present inventions may reduce the amount of harmonics and/or flicker introduced into a power system. A person of ordinary skill in the art will recognize that the digital power supply may be used to supply any electrical load or combinations of loads, including heaters, motors, and the like. In a preferred embodiment described herein, exemplary loads are heating elements found in an electric grill.

Electric grills are a suitable application for a digital power supply with independent load control because a user may wish to have higher heat on one side of an electric grill and lower heat on the other side of the grill. Such an arrangement allows a user to simultaneously grill various foods requiring different temperatures, or to use indirect grilling methods. Examples of indirect grilling methods include placing foods on one side of a cooking surface while heating another side, thereby avoiding direct contact between the food and the heat source. A further benefit of variable power is that it allows a user to input a power setting and achieve targeted temperatures. This makes it possible to cook at low temperatures for prolonged periods of time.

Figure 1A:
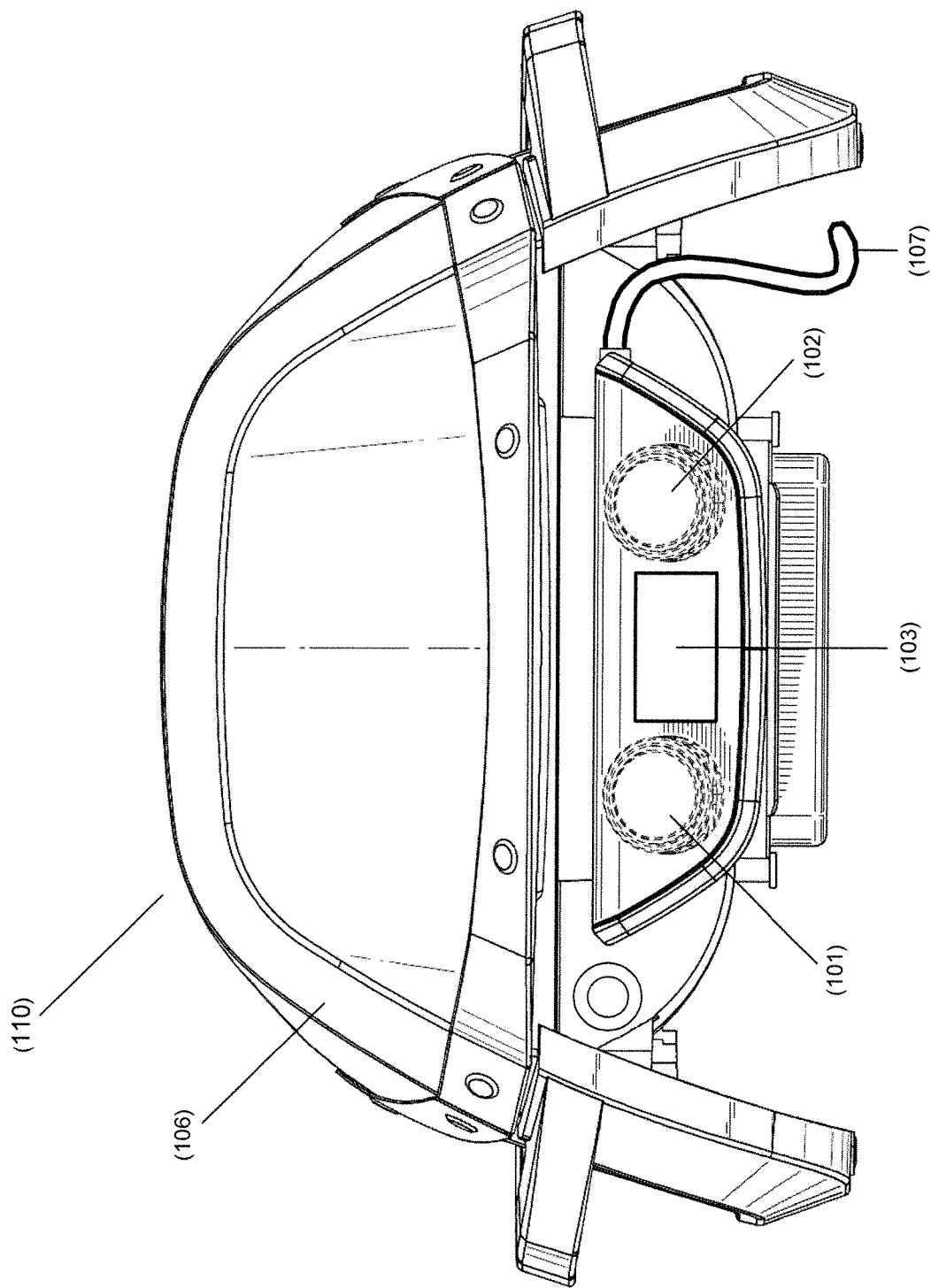
FIG. 1A is a front view of an exemplary grill of the present invention.
Figure 1B:
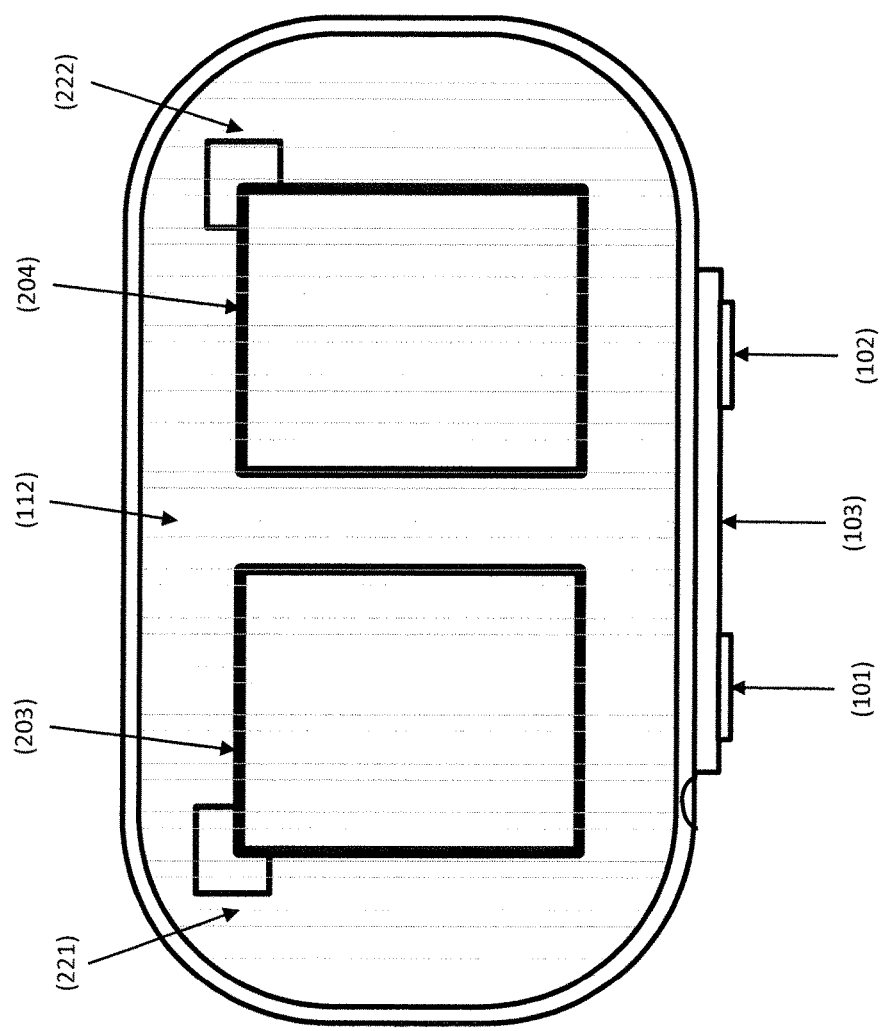
FIG. 1B is a top schematic view of a cooking surface of a representative grill showing representative internal components.

Referring now to the drawings, FIGS. 1-15 show preferred embodiments of an electric grill 110 and a digital power supply 200. By way of example, FIGS. 1A and 1B show a representative electric grill 110. FIG. 1A shows the exterior of electric grill 110, including a housing 106, onto which left and right control knobs 101 and 102, as well as display 103, may be mounted. The electric grill 110 may include a power cord 107 for connecting to an AC wall outlet. Left and right control knobs 101 and 102, and display 103, may connect to a microcontroller 213 which is described in greater detail herein.

As shown in FIG. 1B, left and right control knobs 101 and 102 may be associated with a first and second heating element, 203 and 204, respectively, thus creating dual cooking zones. A representative grate or cooking surface 112 is also shown in FIG. 1B. Each heating element 203 and 204 may be controlled independently by a knob 101, 102 or any other controller associated with the heating element 203, 204. Left knob 101 and right knob 102 may be positioned on the exterior of a grill housing 106. The knobs 101 and 102, or any other input device that will be understood by those of skill in the art, may be connected to a microprocessor 213 to set the operating mode of one or more heating elements 203, 204.

Using knobs 101 and 102, or any other input device such as a touch screen or buttons (or wirelessly as discussed herein), a user may select an operating mode for each heating element 203 and 204. The operating mode may include a desired temperature or power setting for the heating element. Microprocessor 213, described in further detail herein, controls the electric current delivered to heating elements 203 and 204 in order to deliver the selected power. Microprocessor 213 can achieve a desired temperature for each heating element 203 and 204 using a feedback loop in which it receives a current temperature reading from thermocouples 221 and 222, which are proximally positioned by respective heating elements 203 and 204. A person of ordinary skill in the art would recognize that various types and numbers of knobs, heating elements, temperature sensors and/or displays may be used.

The electric grill 110 may optionally include a display 103 or other user interface. In one example the display 103 may be connected to microprocessor 213 and display information relating to the current settings or operation of one or more of the heating elements 203, 204. For example, the display 103 may show the current temperature in the proximity of heating elements 203 and 204 (as measured by thermocouples 221 and 222), as well as the desired temperature or power setting a user has selected via knobs 101 and/or 102.

Figure 2A:
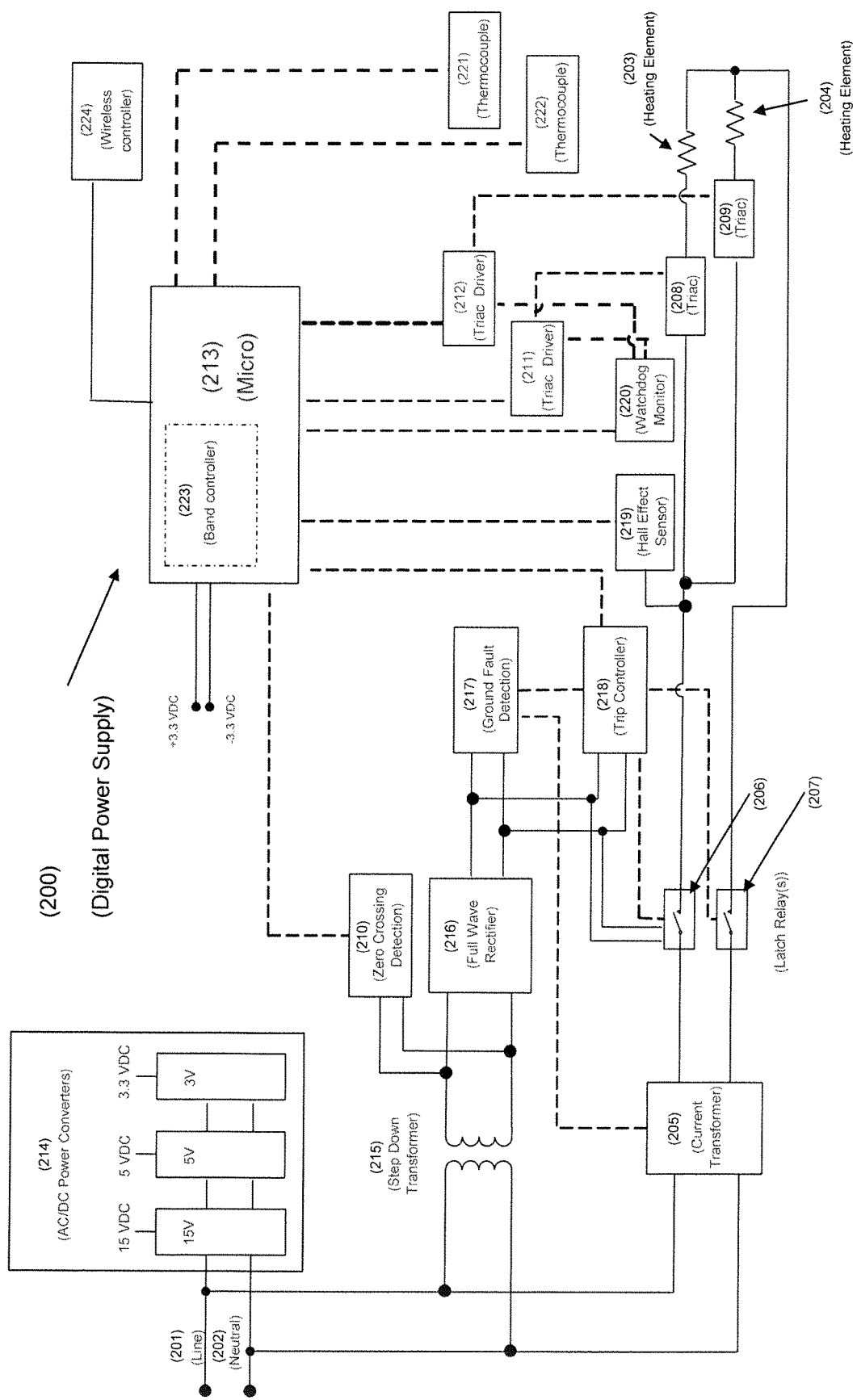
FIG. 2A is a schematic of an exemplary embodiment of a circuit, including a digital power supply circuit of the present invention.
Figure 2B:
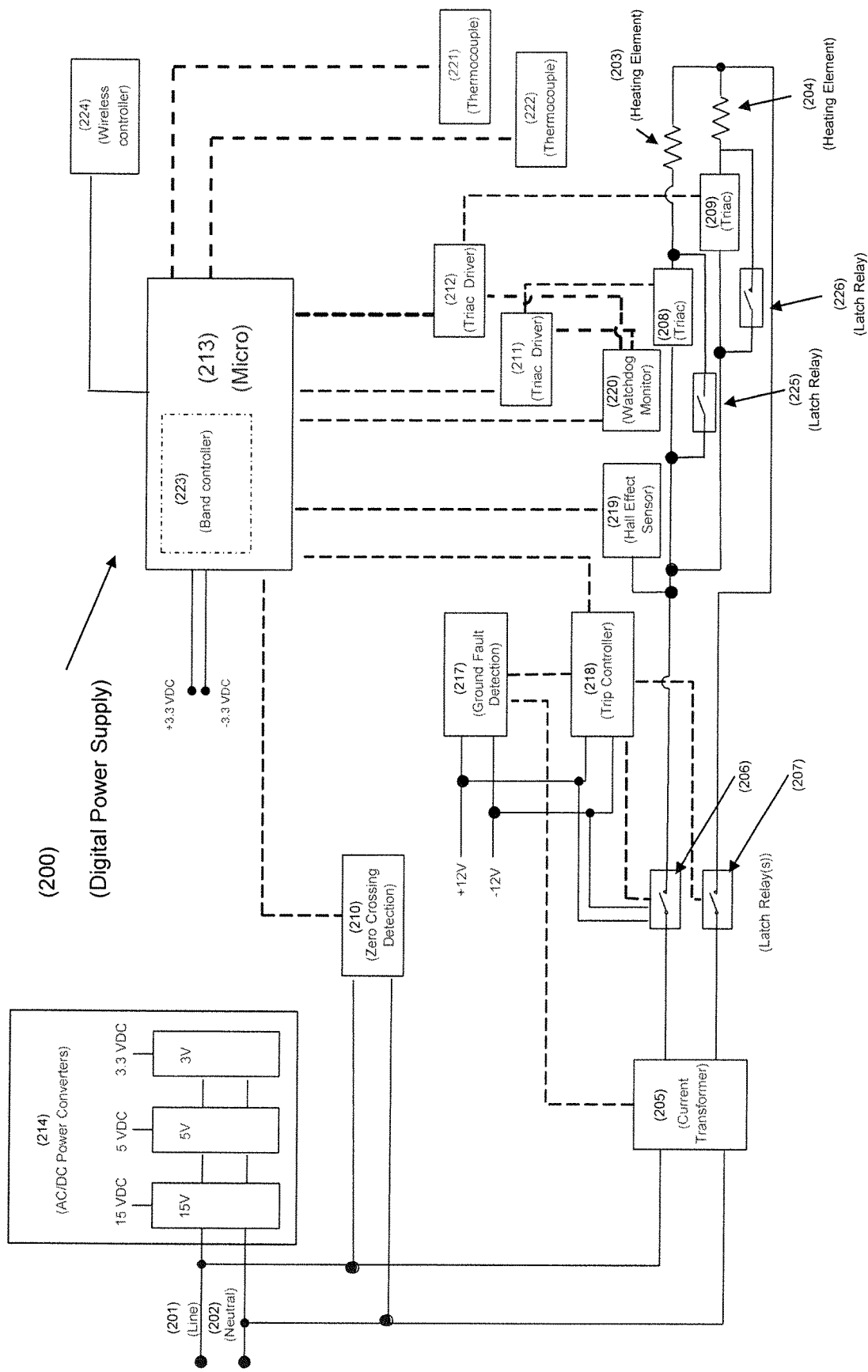
FIG. 2B is a schematic of an exemplary embodiment of a circuit, including a digital power supply circuit and a wireless controller of the present invention.

Turning now to FIGS. 2A and 2B, in general, non-limiting terms, digital power delivery may be accomplished by a microprocessor 213 which receives a user's desired power setting(s) and controls triacs 208 and 209 to enable (or disable) AC current to flow from voltage line 201 through heating elements 203 and 204 and return to a wall outlet through neutral 202. Additionally provided herein is a specifically configured microprocessor 213 which may control the flow of AC current to the heating elements 203 and 204 in a manner that reduces the amount of harmonic current and flicker introduced by the electric grill 110 to the AC wall outlet.

As shown in the embodiment of FIG. 2A, microprocessor 213 is in communication with triac drivers 211 and 212, which in turn control respective triacs 208 and 209. The mechanism by which microprocessor 213 may deliver power to heating elements 203 and 204 is by turning triacs 208 and 209 on or off (sometimes referred to as "enabled" and "disabled," respectively) via their corresponding triac drivers 211 and 212.

Specifically, triacs 208 and 209 turn "on" when they are triggered by a pulse from microprocessor 213. Current continues to flow until an AC current wave crosses zero. After a zero crossing, a triac turns off and remains off until the next time microprocessor 213 turns it on. In an example where AC current is 60 Hz, such as a typical wall outlet, a zero crossing occurs every $1/120^{th}$ of a second. A zero crossing detection unit 210 is provided to communicate a signal to microprocessor 213 each time an AC wave crosses zero. Using this signal, microprocessor 213 can synchronize its timing to the alternating current's zero crossings.

Instead of permitting direct communication between microprocessor 213 and triacs 208 and 209, triac drivers 211 and 212 are used to interface between microprocessor 213 and triacs 208 and 209. Triac drivers can control a high voltage triac with a low voltage DC source (such as a microprocessor) (as seen in the embodiments of FIGS. 2A and 2B). Moreover, triac drivers are used to isolate devices from a potentially high current or voltage in a triac. Triac drivers 211 and 212 interface between microprocessor 213 and triacs 208 and 209 while at the same time keeping microprocessor 213 isolated from voltages and currents in triacs 208 and 209.

An "on" triac allows current to flow through it, whereas an "off" triac does not allow current to flow. Thus, an "on" triac 208 permits AC current to flow (from voltage line 201) through first heating element 203 and an "on" triac 209 permits AC current to flow (from voltage line 201) through second heating element 204. To say that microprocessor 213 delivers power to a heating element 203 and/or 204 implies that microprocessor 213 enables the respective triac driver, which turns the relevant triac "on" and allows AC current to flow from line 201. Throughout this disclosure, it should be understood that references to microprocessor 213 delivering power to a heating element mean that microprocessor 213 is activating a given heating element's triac driver via an "on" or "enable" pulse signal.

As a person of ordinary skill will understand, triacs are three electrode devices, or triodes, that conduct alternating current. Triacs are a type of solid state bidirectional switch. Although this disclosure describes a digital power supply that uses triacs, it should be understood that any solid state bidirectional switch may be used instead of a triac. Heating elements 203 and 204 may be resistive heaters which increase in temperature as more current passes through them. Exemplary heating elements may draw 1150 Watts. Other heating elements 203, 204 may also be used as will be understood by those of skill in the art.

In embodiments of the invention, microprocessor 213 may optionally receive temperature feedback from one or more thermocouples 221 and 222 located proximately to each heating element 203 and 204 in order to recognize when a desired temperature has been achieved. FIG. 1B shows an example of thermocouples 221 and 222 adjacent to each heating element 203 and 204. Although FIG. 1B shows a thermocouple as an example, it should be understood that any other type of temperature sensing device, including without limitation thermistors, resistive thermal devices, and the like, may also be used. In an embodiment, the feedback may be used by microprocessor 213 to adjust the current delivered to the heating elements 203 and 204 until the desired temperatures selected by knobs 101 and/or 102 is achieved. As a result, a user can (independently) select a desired operating mode for heating elements 203 and 204. In embodiments of the invention, microprocessor 213 may control the current delivered until a desired temperature setting is reached and then maintain the desired temperature.

Turning next to the operation of microprocessor 213, microprocessor 213 may be configured to deliver an appropriate amount of power (as selected by the user) by toggling triacs 208 and 209 between "on" and "off." As described above, an enabled (or "on") triac 208 or 209 allows AC current to flow from line 201 through heating elements 203 or 204, respectively. Therefore it follows that a longer "on" period allows more AC current to flow and therefore delivers more power. Conversely, a longer "off" period results in lower power delivery.

In embodiments of the invention, microprocessor 213 may use phase angle control techniques to create a pattern of toggling between "on" and "off." The control pattern created by toggling between "on" and "off" controls the phase angle of AC current (and by extension, power) flowing from voltage line 201 through heating elements 203 and 204. This type of control pattern is sometimes referred to as "phase cutting," because AC current's wave forms may be "cut" off. Waves are cut by disabling the flow of current during part of an AC wave cycle. In this way, part of the wave becomes "cut" off. The timing pattern of "on" and "off" creates a phase-controlled wave. To determine the correct angle at which to cut a wave for a desired power delivery, microprocessor 213 solves the equation:

(angle)=arccos(2x−1)

where x is the desired power delivery (expressed as a percentage: 0.0≤x≤1.0). Microprocessor 213 is programmed to solve for the angle at which to cut the AC sine wave delivered to heating elements 203 and 204. This disclosure refers to angles in "degrees," but a person of skill in the art will understand that every angle measurement may be converted into the unit "radians."

Figure 3A:
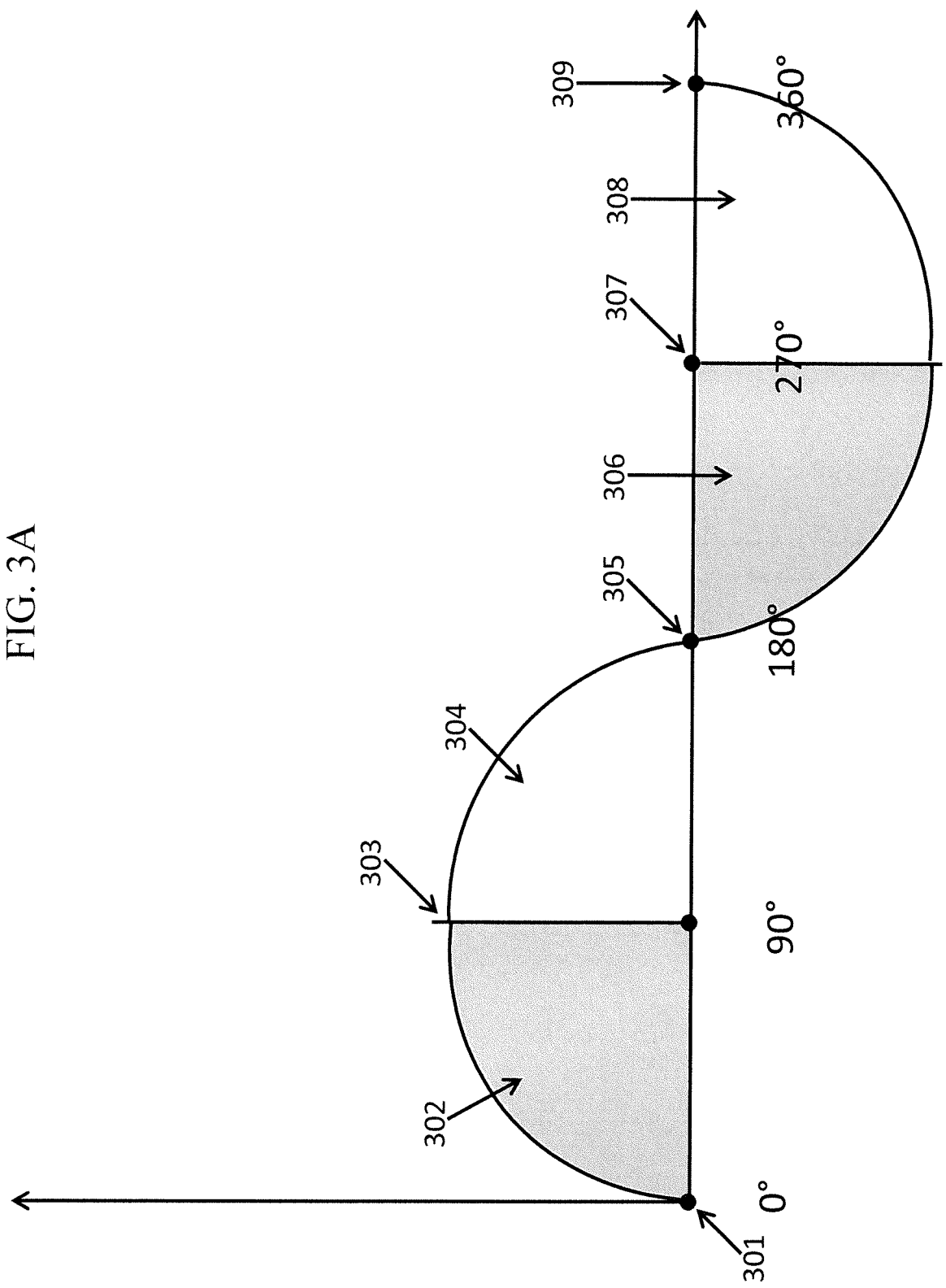
FIG. 3A is an exemplary wave form with a 90 degree cut of the present invention.

An example is provided in FIG. 3A, which illustrates an example where microprocessor 213 cuts an AC wave at 90°. A 90° cut produces a wave that delivers half (i.e. 50%) of the total available power. FIG. 3A shows one wave cycle of an AC current. A person of skill in the art will understand that a complete wave has a positive half and a negative half. The wave cycle begins at 301 where the current's value is zero. The area between 301 and 303, numbered 302 is shaded gray to indicate a triac is not enabled and therefore current is not being delivered. At 303, which represents a 90° phase angle, microprocessor 213 sends a pulse signal to activate a triac and thus allow current to flow through a heating element. (Stated differently, microprocessor 213 begins delivering power at 303). At 305, current crosses zero and the triac turns off. The triac remains off until 307, which represents a 270° phase angle. At 270°, microprocessor 213 again sends an activating pulse and current flows for a 90° phase, between 307 and 309, i.e. from 270° to 360°.

Figure 3B:
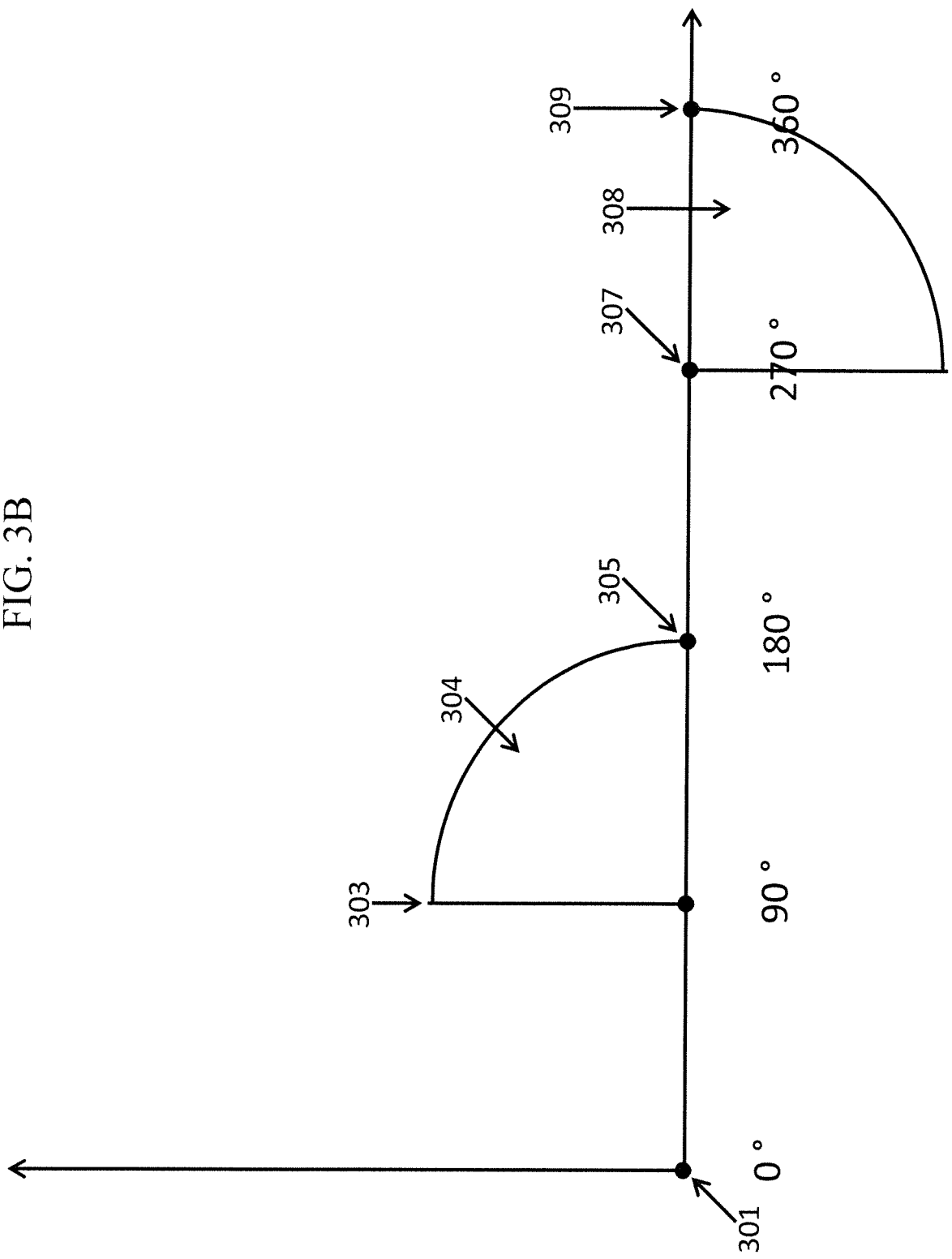
FIG. 3B is an exemplary wave form with a 90 degree cut of the present invention.

In sum, FIG. 3A shows microprocessor 213 delivering power for the areas marked 304 and 308, each representing 90° phases, for a combined 180°. No power is delivered for the shaded areas marked 302 and 306, also representing 90° each, for a combined 180°. In this way, microprocessor 213 has delivered half, or 50%, of the power that was available. To deliver a different power percentage, microprocessor 213 may send an activating pulse earlier in a half-wave to deliver more power, or later in a half wave to deliver less power. For any desired power percentage, the appropriate phase angle cut may be calculated by microprocessor 213 solving for (angle)=arccos(2x−1). In the example of FIG. 3A, a 50% power deliver was selected. Therefore, microprocessor 213 executed the calculation (phase angle)=arccos (2*0.5−1) =90°. FIG. 3B removes the "cut off" wave portions of FIG. 3A and shows only the power actually delivered.

Figure 3C:
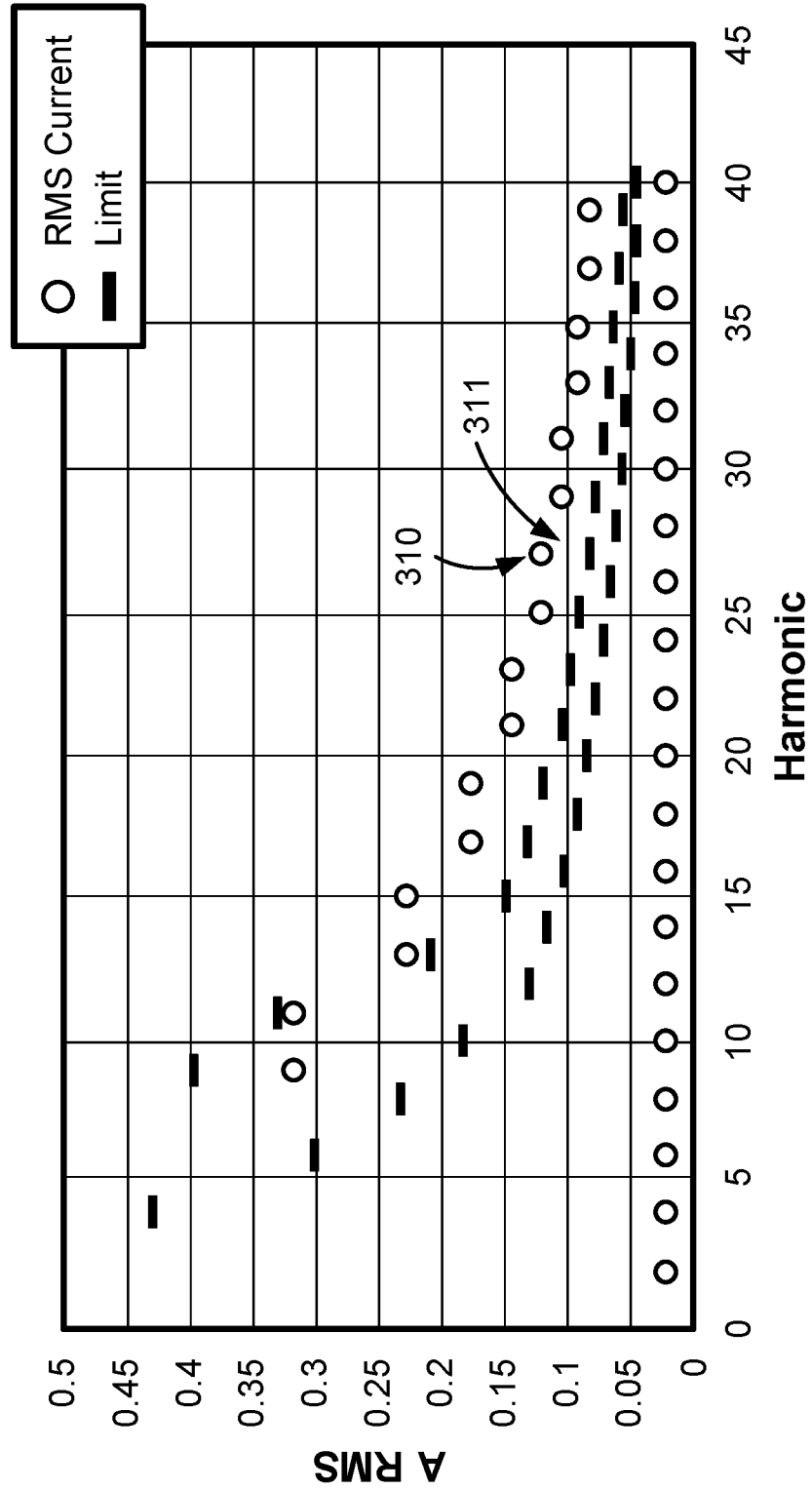
FIG. 3C shows harmonic currents plotted against standard limits showing harmonic currents by a 1150 W element.

Turning now to FIG. 3C, a graph is provided which shows the harmonic currents introduced into a power system by a 90° phase cut described in FIGS. 3A and 3B. In other words, these plotted harmonic currents may be introduced into a building's power lines when an electric grill is plugged into a wall outlet and makes the 90° phase cut described in FIGS. 3A/3B. The plot is made using a 1150 W heating element. Introducing harmonics is undesirable because it leads to electromagnetic interference. Moreover, there are standards, such as IEC 61000-3-2 Electromagnetic compatibility (EMC)—Part 3-2, which limit the level of harmonic currents that may be introduced into a wall outlet by a device. The harmonic current limits are plotted as line segments in the graph of FIG. 3C. As will be clear from FIG. 3C, the harmonic currents (plotted as points) introduced by the 90° phase cut exceed the harmonic limits (plotted as line segments). In other words, the graph in FIG. 3C shows that the points (representing the RMS current) are higher than the lines which mark the harmonic limits. This means that the wave forms of FIGS. 3A/3B have high harmonic currents and do not comply with the IEC standard. For example, RMS current at point 310 is one example of a harmonic current that exceeds (i.e., is above) the harmonic limit 311.

Figure 4A:
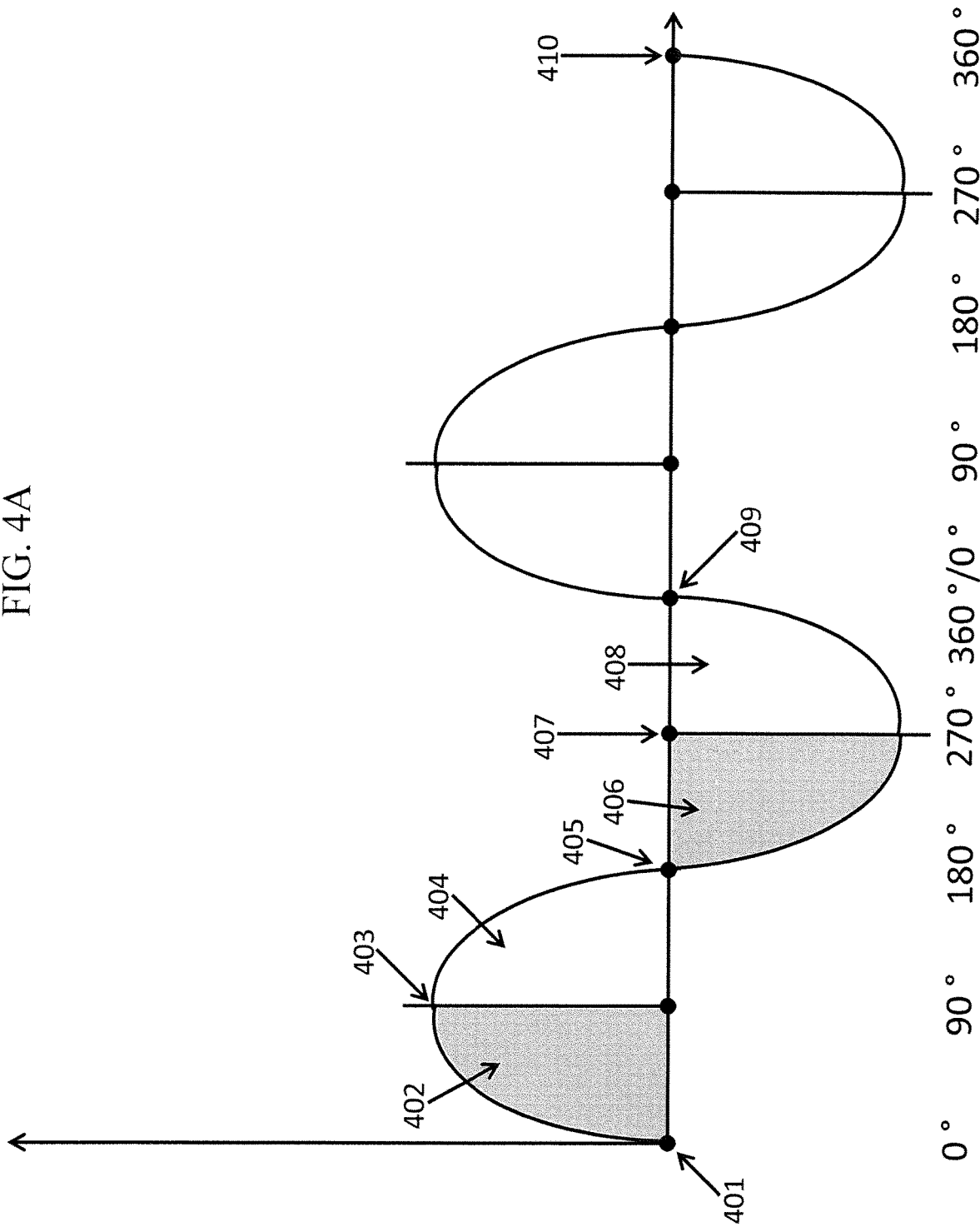
FIG. 4A is an exemplary cut wave form followed by an "on" wave of the present invention.
Figure 4B:
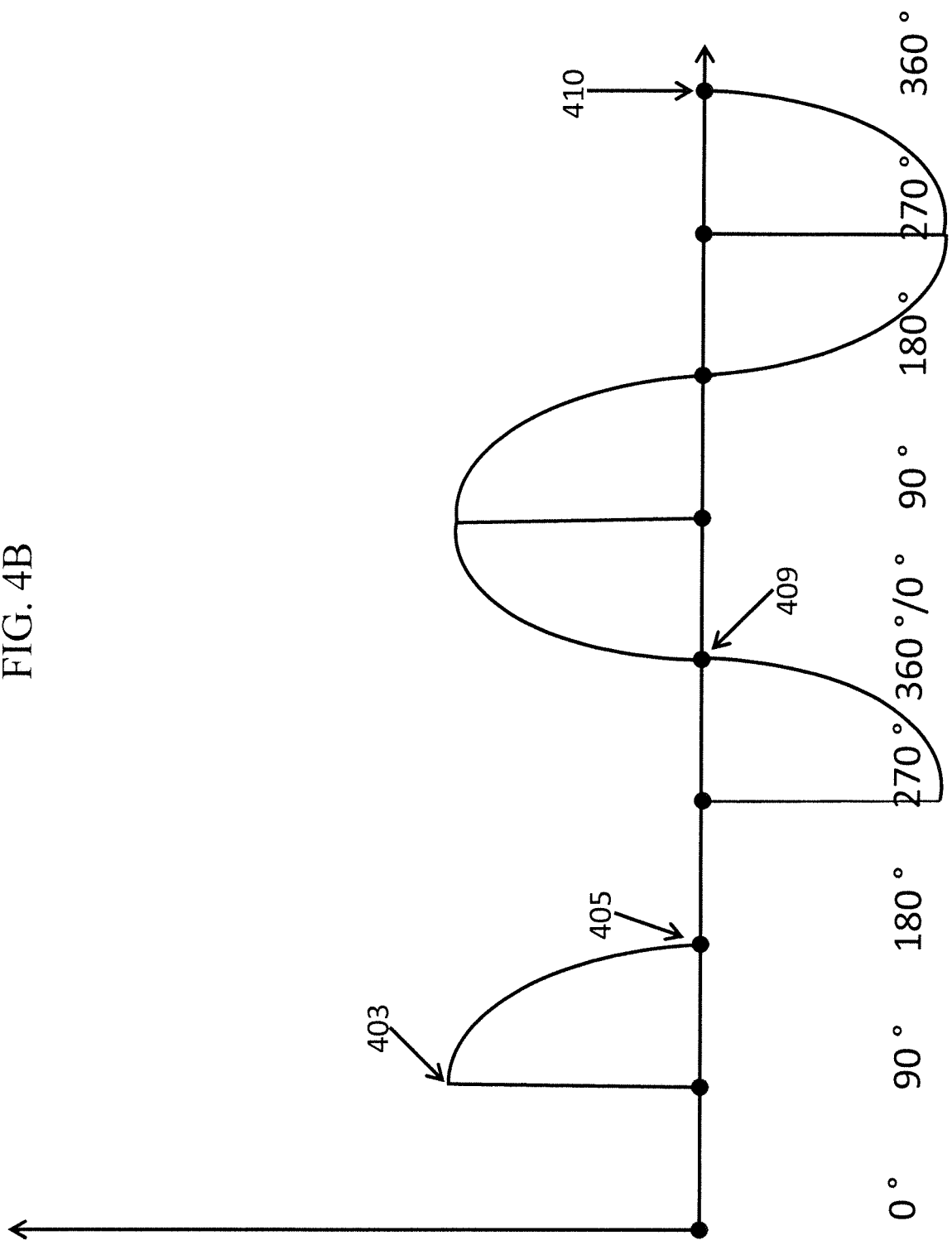
FIG. 4B is an exemplary cut wave form followed by an "on" wave of the present invention.
Figure 4C:
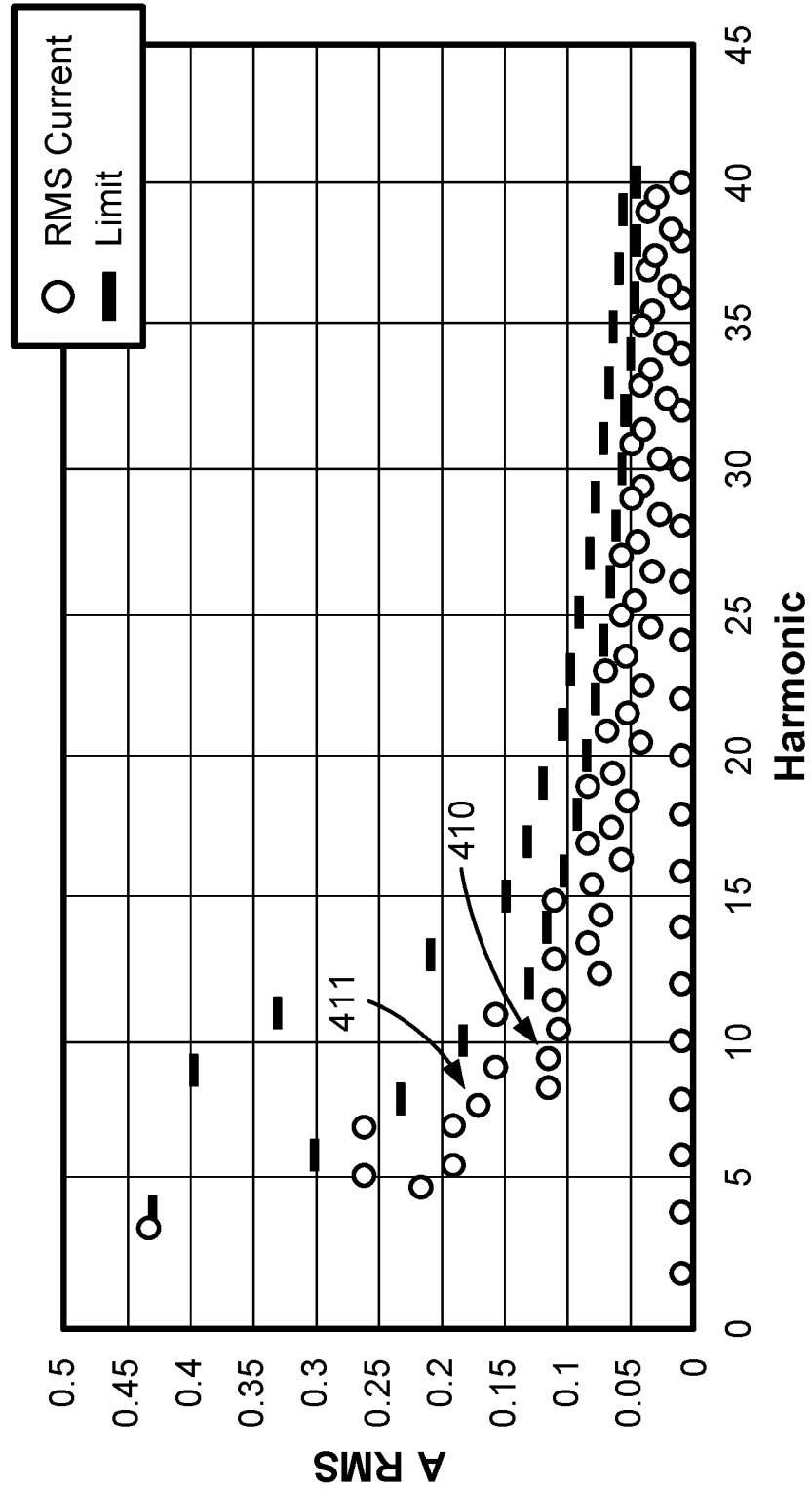
FIG. 4C shows harmonic currents plotted against standard limits showing harmonic currents by a 1150 W element.
Figure 5A:
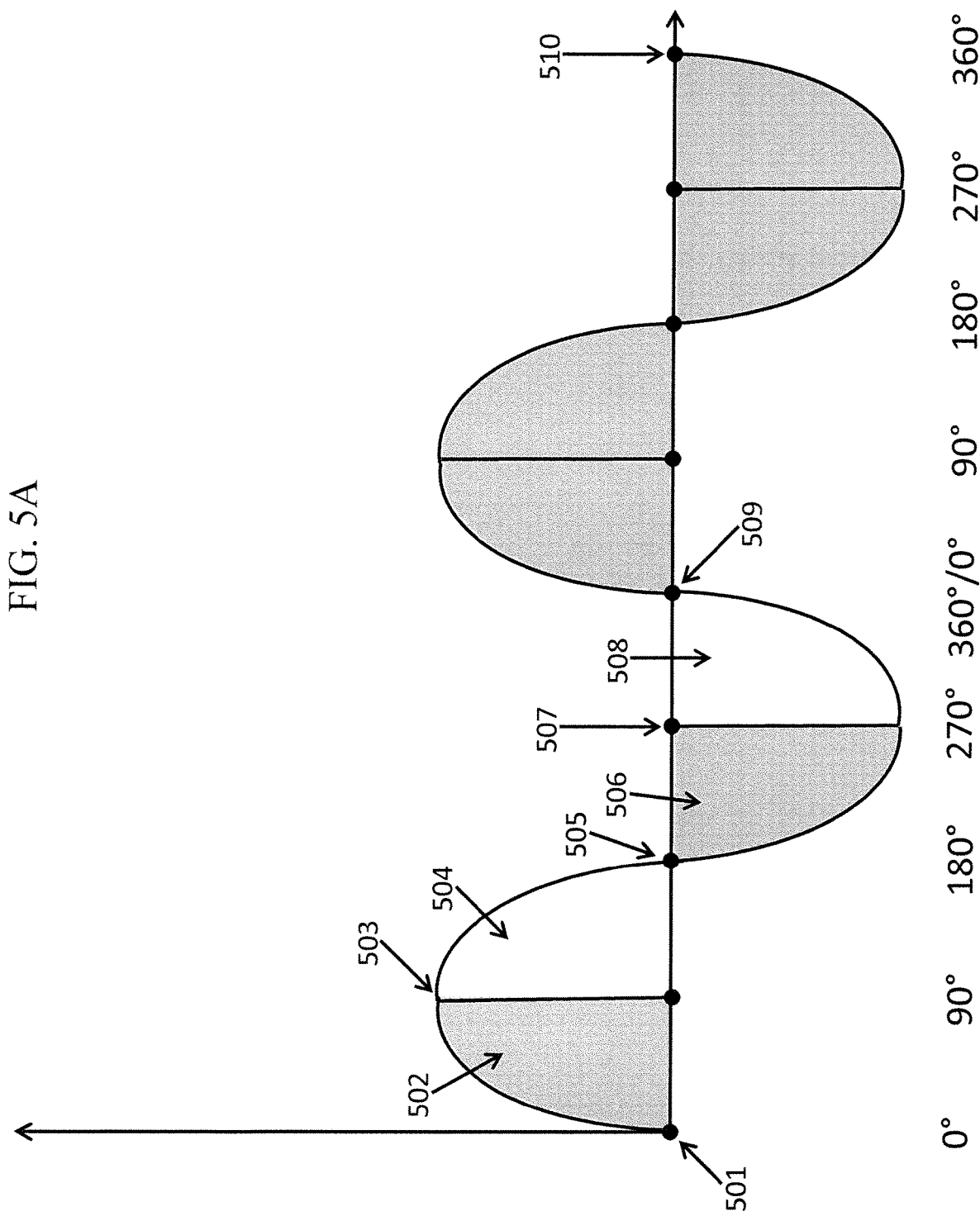
FIG. 5A is an exemplary cut wave form followed by an "off" wave of the present invention.
Figure 5B:
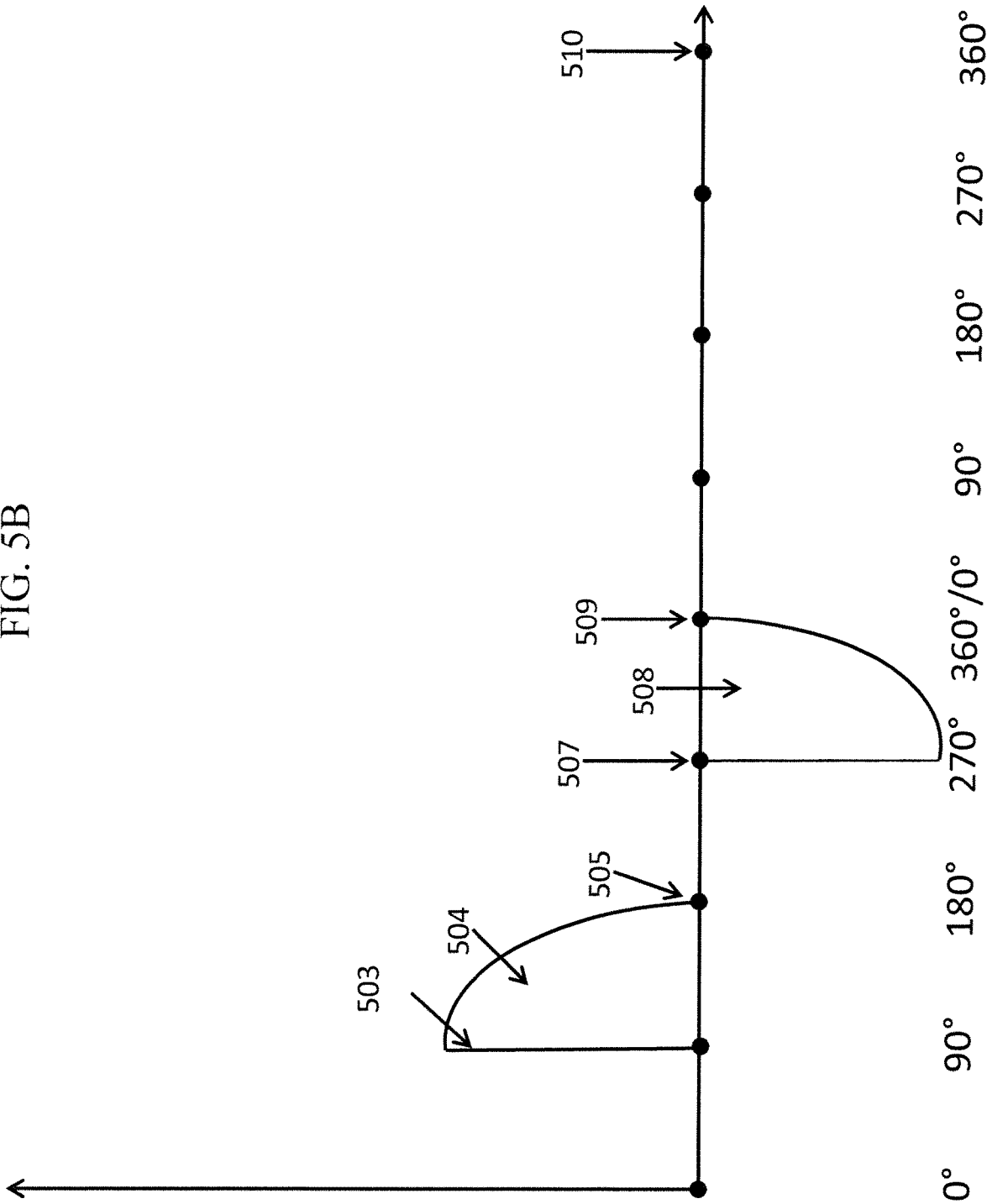
FIG. 5B is an exemplary cut wave form followed by an "off" wave of the present invention.
Figure 5C:
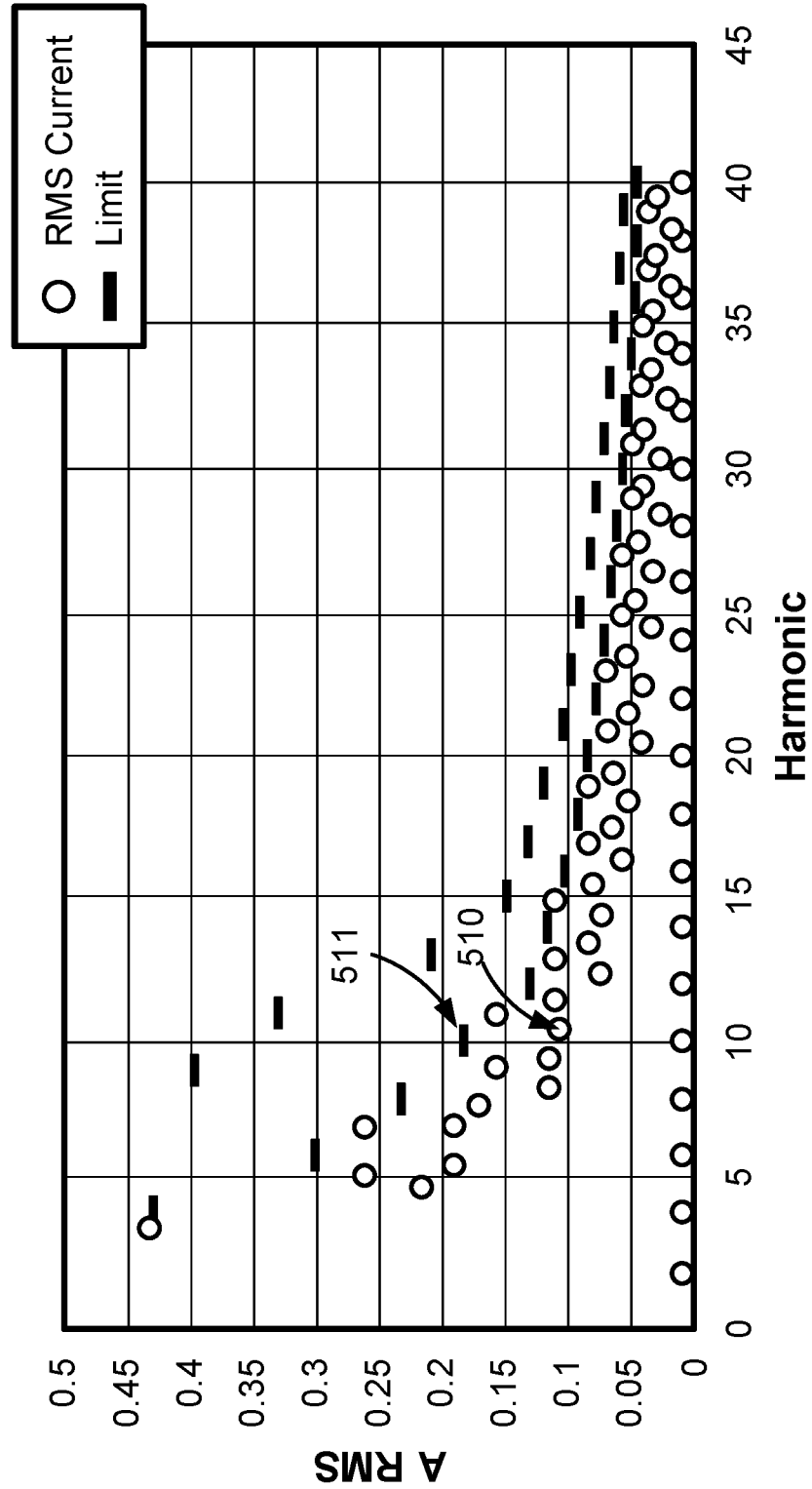
FIG. 5C shows harmonic currents plotted against standard limits showing harmonic currents by a 1150 W element.

Therefore, embodiments of the inventions include a microprocessor 213 specially configured to deliver power to electric loads using wave cuts that induce harmonic currents having reduced magnitudes. As an initial matter, Applicants' testing has shown harmonic currents' magnitudes are reduced when a wave cut is immediately followed by a full wave cycle "on" or a full wave cycle "off" Applicants' test results are shown in FIGS. 4 and 5. In particular, FIG. 4A shows a first wave cycle having the same 90° cut as in FIG. 3A, but is followed by a subsequent second wave cycle (between 409 and 410) that is fully "on." Similarly, FIG. 5A shows a first wave cycle having the same 90° cut as FIG. 3A, and additionally followed by a second full wave cycle (between 509 and 510) that is fully "off." For clarity, FIGS. 4B and 5B show the same respective patterns without the "cut" portions of a wave. Applicants' testing, shown in FIGS. 4C and 5C, shows that a 90° cut induces fewer harmonics when it is followed by a subsequent full "on" or a full "off" wave cycle. These results can be seen in FIGS. 4C and 5C, where the plotted harmonic currents (points) are now below the harmonic current limits of the IEC standard (plotted as line segments), and are noticeably lower than the harmonic currents plotted in FIG. 3C. By way of example, FIG. 4C shows an exemplary RMS current point 410 that is below the harmonic limit 411. Unlike FIG. 3C, the RMS currents of FIG. 4C are under the harmonic limits. The same applies to FIG. 5C, where exemplary current point 510 is under the harmonic limit of 511.

Therefore, embodiments of the inventions include a microprocessor 213 specifically configured to follow a cut wave with either a full "on" or a full "off" wave. Moreover, microprocessor 213 may be specifically configured to draw current in a pattern that reduces harmonic currents while still managing to split the drawn current among two independent heating elements 203, 204. In other words, microprocessor 213 must manage the pattern of the overall current drawn by the electric grill 110 while simultaneously satisfying the power requirements of both independent heating elements 203, 204. The pattern of the overall current drawn by electric grill 110 may be referred to as the electric grill 110's total power array. The electric grill 110's total power array is the sum of the first heating element 203's power array plus the second heating element 204's power array. An exemplary power array may be four cells, each cell containing a value (0.0≤x≤1.0) representing a percentage of power to deliver in a wave form. Thus, an exemplary power array may represent a pattern of four waves. It will be understood that the total power (or, current) drawn by electric grill 110 is the sum of the power (current) drawn by the heating elements. The wave form patterns delivered to the heating elements 203, 204 may likewise be represented as four-celled power arrays. The first heating element's power array summed with the second heating element's power array equals the electric grills total power array. The same holds true for any number of heating elements in an electric grill 110. The electric grill 110's harmonic currents depend on the pattern of waves drawn by the electric grill 110, represented in the total power array. To reduce harmonic currents, electric grill 110's total power array should represent a pattern where each "cut" wave is followed by a full "on" or a full "off" cycle.

Figure 6:
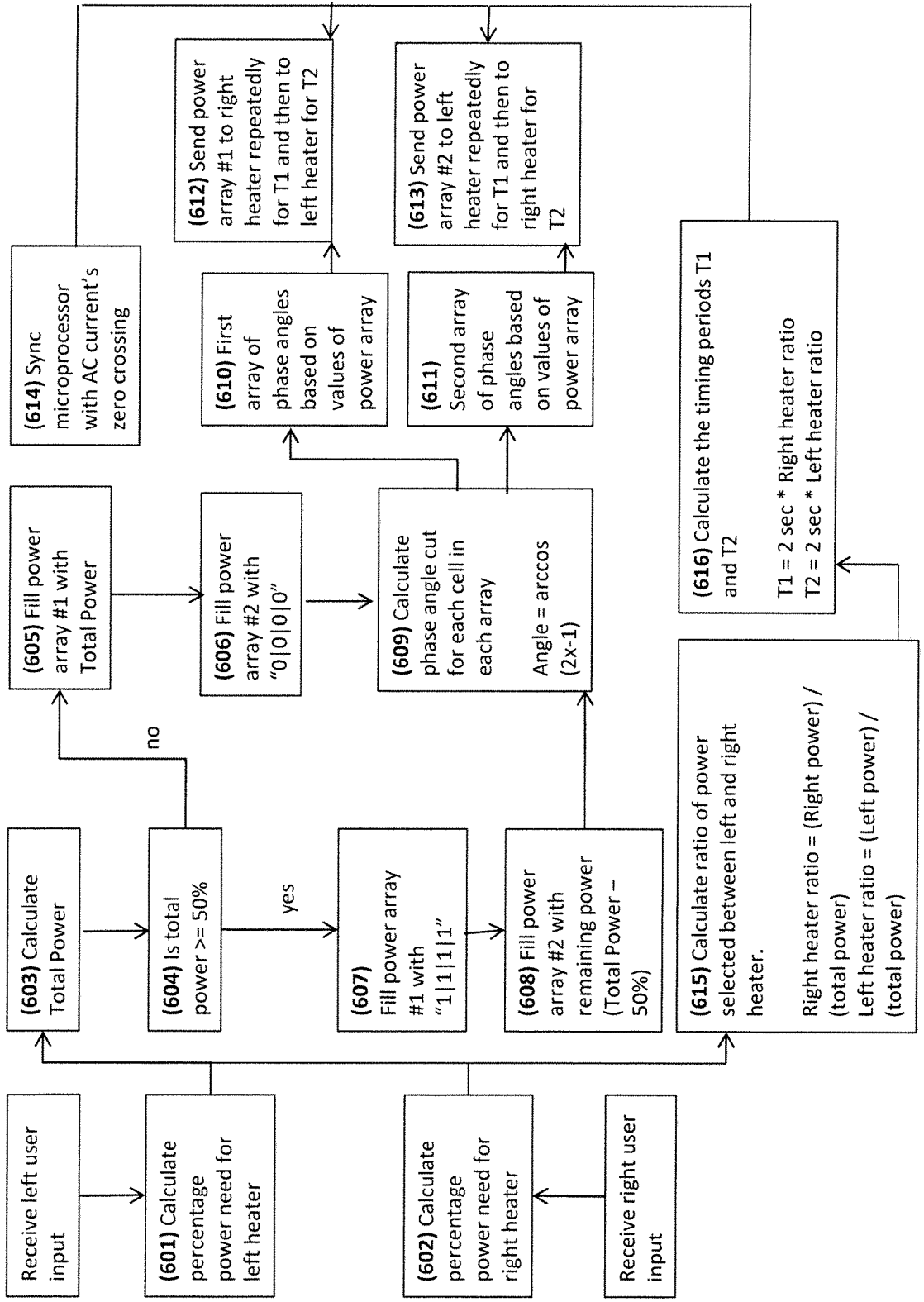
FIG. 6 is a flow chart of an exemplary microprocessor configuration of the present invention.

FIG. 6 is a flow chart showing an exemplary configuration of microprocessor 213 for controlling two heating elements while introducing fewer harmonics. Generally speaking, microprocessor 213 calculates a power array to deliver to each heating element 203, 204. The power arrays depend on a user's power settings for each of the two heating elements 203, 204 as well as feedback from thermocouples 221 and 222. In this example, each power array consists of four cells (but another number of cells may be used), each cell containing a number ranging between 0.0≤x≤1.0. Each of the four cells represents a wave cycle, the cell's number indicating the percentage of power delivered during that wave cycle. By way of example, an array of "1|0|1|0" would represent one "on" wave, one "off" wave, another "on" wave, and another "off" wave. Microprocessor 213 delivers the wave forms from the two calculated power arrays to the two heating elements 203, 204 by toggling the triac drivers 211 and 212 in the manner described above.

Addressing FIG. 6 more particularly, microprocessor 213 communicates with a first and second user input device, such as a left knob 101 and a right knob 102. The first and second user input devices convey a power level for each of the two heating elements 203, 204. The desired power levels can be converted by microprocessor 213 into a percentage of total power at steps 601 and 602. Microprocessor 213 determines if the total power 603 is greater than or equal to 50% at step 604.

Figure 7:
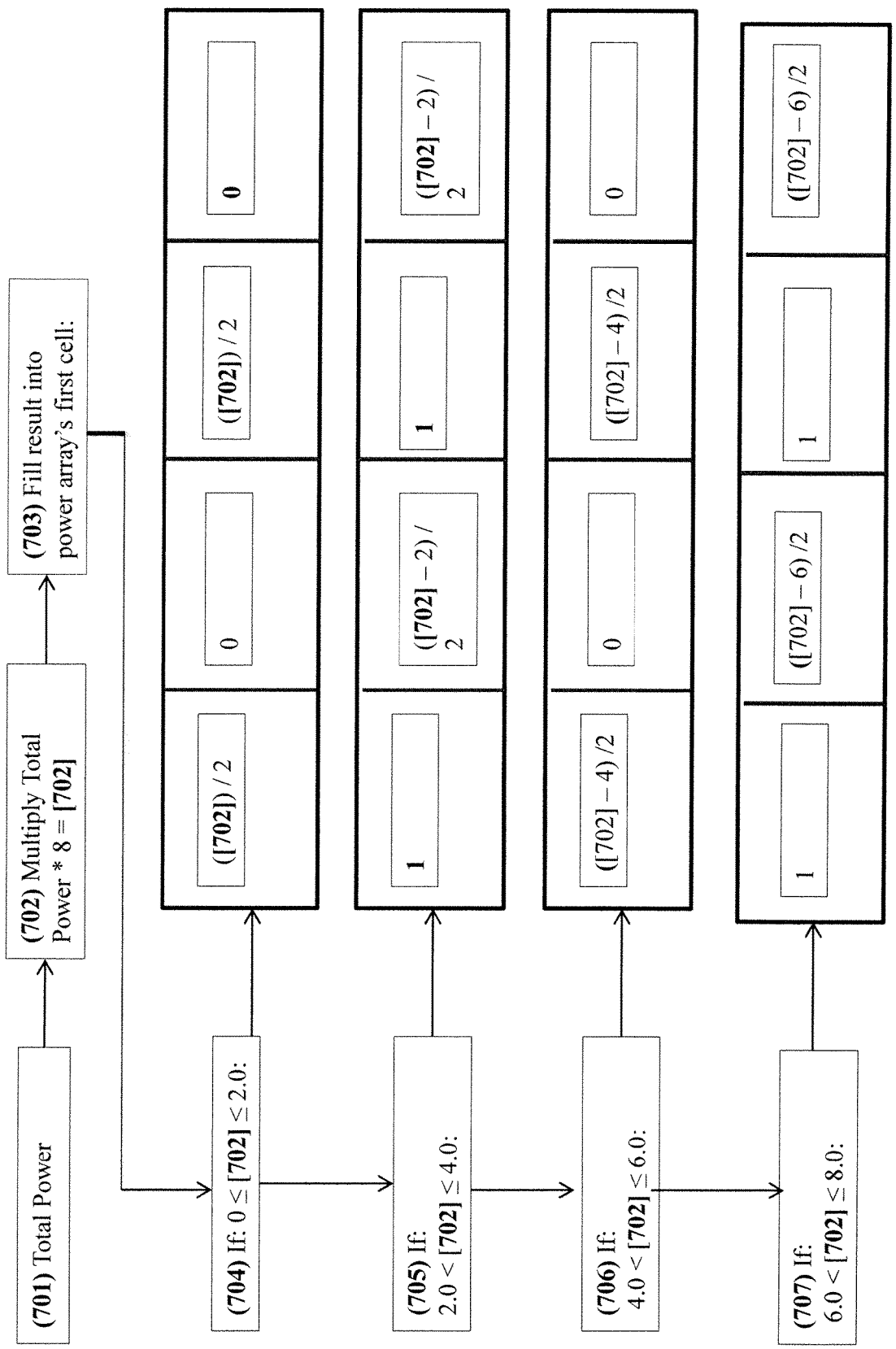
FIG. 7 is an exemplary algorithm for populating a power array of the present invention.

At 605, where a user's selected total power is less than 50%, microprocessor 213 begins filling (or, "populating") the cells of the first power array. FIG. 7 shows the steps microprocessor 213 is configured to execute to fill, or populate, a power array. As seen in FIG. 7, microprocessor 213's calculation begins at 701 with the total power requested by a user. (This is the sum of the power requested for the right heating element and the power requested by the left heating element as determined in 603). The percentage of total power requested is multiplied by 8 (because there are 2 arrays×4 cells each) at step 702. The value of step 702, herein referred to using the notation [702], is used to populate a power array at 703. If the value of 702 is less than or equal to 2.0, the value of 702 is distributed evenly between the first and third array elements to arrive at: "([702]/2)|0|([702]/2)|0." This is seen at step 704. If the value of 702 is greater than 2.0, then the first and third array elements are filled with "1," and the remainder (subtracting 2 from the value of 702) is distributed evenly between the second and fourth cells. This is seen at 705. Using this technique, a power array is constructed to have a full "on" or a full "off" wave that follows a cut wave to reduce the magnitude of harmonic currents. Moreover, the power array's alternating pattern reduces flicker, as described in more detail below. Returning now to FIG. 6, the second power array is filled with four zeros: "0|0|0|0" at step 606.

Again by reference to FIG. 6, if the Total Power 603 equals or exceeds 50%, microprocessor 213 fills the first power array with all 1's ("1|1|1|1.") at step (607).

Microprocessor 213 then populates the second power array using the conditions of 706 and 707. Regardless of whether the user has requested more or less than 50% power, one of the two power arrays will have the alternating pattern "A|B|A|B," while the other array will have the pattern "C|C|C|C," where C=0 or 1. Once the first and second power array have been populated, they are delivered to the heating elements 203 and 204.

Power is delivered by microprocessor 213 to a triac driver based on the values in the four cell power arrays. As described above, each cell represents one full wave cycle, and the cell's numeric value represents the percentage of power to deliver in that wave cycle. As also described above, embodiments of the inventions may use phase cutting techniques to control power. Thus, at step 609, microprocessor 213 is configured to calculate the phase angle at which to "cut" a wave in order to achieve the power represented by a cell in a power array. Microprocessor 213 is configured to solve the equation:

$$(\text{angle}) = \arccos(2* \text{power} - 1),$$

where "power" is the power represented by a number in a power array's cell. Microprocessor 213 uses this angle to deliver a wave cycle having power that corresponds to the cell's numeric value. The calculation may be repeated for each cell in each power array. Each cell of each power array may be converted into a corresponding phase angle 610 and 611. The corresponding phase angle arrays contain phase angles, rather than power percentages, and may be stored in the same format at the power arrays.

At step 614, microprocessor 213 may synchronize its timing to the phase angle of AC current in line 201. As described above, microprocessor 213 receives a zero crossing signal from zero crossing detection 210 each time the AC current crosses zero from zero crossing detection unit 210. The zero crossing signal can thus synchronize microprocessor 213's timing (and therefore by extension, the angle) of an AC wave. For example, a person of skill in the art will then recognize that a wave of AC current has the following angles at the indicated points in time:

TABLE 1

| Desired phase angle "cut" | 60 Hz AC current: Time (where zero crossing is t = 0) |
|---|---|
| 0° | 0 seconds |
| 10° | 0.000462963 seconds |

TABLE 1-continued

| Desired phase angle "cut" | 60 Hz AC current: Time (where zero crossing is t = 0) |
|---|---|
| 20° | 0.000925926 seconds |
| 30° | 0.001388889 seconds |
| 40° | 0.001851852 seconds |
| 50° | 0.002314815 seconds |
| 60° | 0.002777778 seconds |
| 70° | 0.003240741 seconds |
| 80° | 0.003703704 seconds |
| 90° | 0.004166667 seconds |

Using this information, microprocessor 213 may use an internal timing mechanism, such as a clock signal generator or any other appropriate mechanism, to send the "on" or "enable" pulse at an instance corresponding to the angle required for the correct "cut." For example, Table 1 shows that a 90 degree cut would be made by activating a triac 0.004166667 seconds after a zero crossing. Microprocessor 213 may use a clock signal to enable a triac at the appropriate point in time. A person of skill in the art reading this disclosure will understand how to calculate the timing for any desired wave "cut."

Turning now to steps 612 and 613, the first power array is delivered to the first triac driver 211 and the second power array is delivered to the second triac driver 212 for a period of time equal to T1. This power delivery continues repeatedly for a first time period T1, after which microprocessor 213 delivers the first power array to the second triac driver 211 and delivers the second power array to the first triac driver 212 repeatedly for a second time period T2. After T1, delivery is "flipped" and the first triac driver 211 receives the second power array for duration of T2. The first and second power array, summed together, equal the electric grill 110's total power array—thus, by definition, the first and second power array must always be delivered simultaneously.

The discussion now turns to the calculation of time periods T1 and T2 at 615 and 616. The purpose of time periods T1 and T2 is to "split," or pro-rate, the total power drawn by the electric grill (or any other device using embodiments of the invention) between the two heating elements (or any other electric load) according to the independently selected power for each respective heating element. The power arrays created at steps 605 through 608 create an acceptable wave pattern for the electric grill as a whole. The sum of the power arrays, which is the electric grill 110's total power array, will have a full "on" or full "off" wave following each cut wave, which reduces the magnitude of harmonic currents. It is additionally necessary to calculate the delivery time of each power array to the respective heating elements 203, 204.

The time period T1 is calculated by taking the power setting for the first heating element 203 and dividing it by the total power selected, 603. That ratio is then multiplied by the power delivery phase, which is 2 seconds in this example but may be varied. T1 and T2 are simple ratios of a given heating element's power setting compared to the total requested power. The calculation may be summarized by the following equation:

$T1$=2 seconds*(power selection for first heating element)/((power selection for first heating element)+(power selection for second heating element)).

Similarly, T2 is the same calculation, this time for the second heating element 204:

$T2$=2 seconds*(power selection for second heating element)/((power selection for first heating element)+(power selection for second heating element)).

Figure 8:
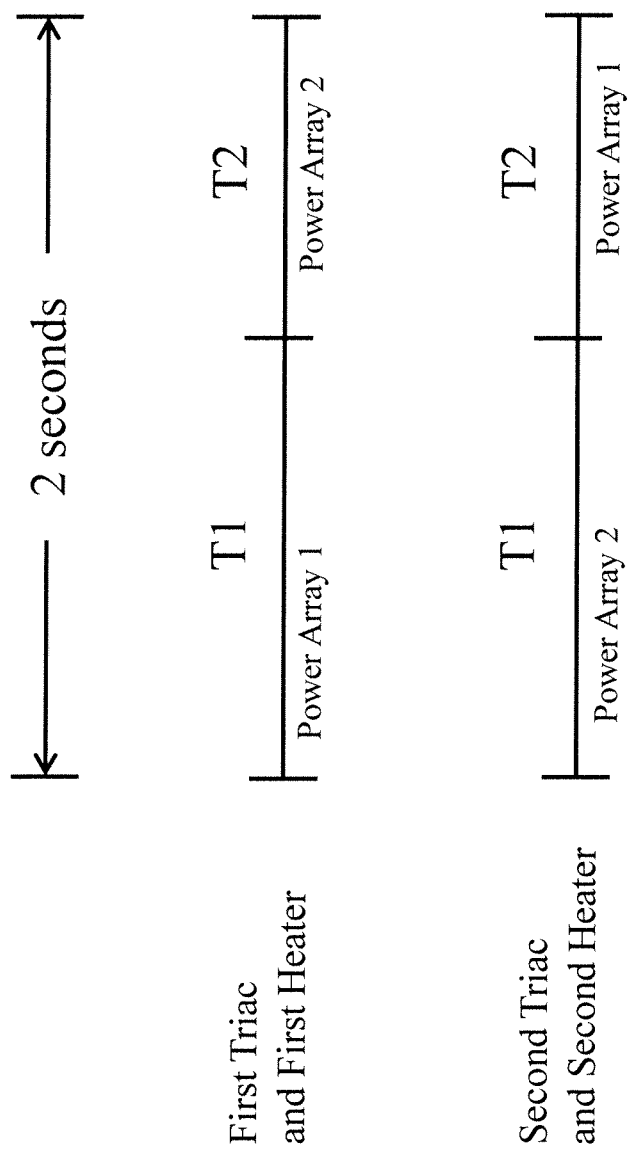
FIG. 8 shows exemplary power delivered to two heating units over a period of time of the present invention.

FIG. 8 summarizes microprocessor 213's power delivery of the first and second power array to the first and second triac drivers over a power delivery phase of 2 seconds: the first triac driver 211 (and by extension first heating element 203) receives the waves represented by the first power array for a time T1. It then receives waves represented by the cells of the second power array for a time T2. Conversely, the second triac Driver 212 (and by extension the second heating element 204) receives waves represented by the cells of the second power array during the time period T1, and then receives waves represented by the cells of the first power array during the time period T2.

Figure 9:
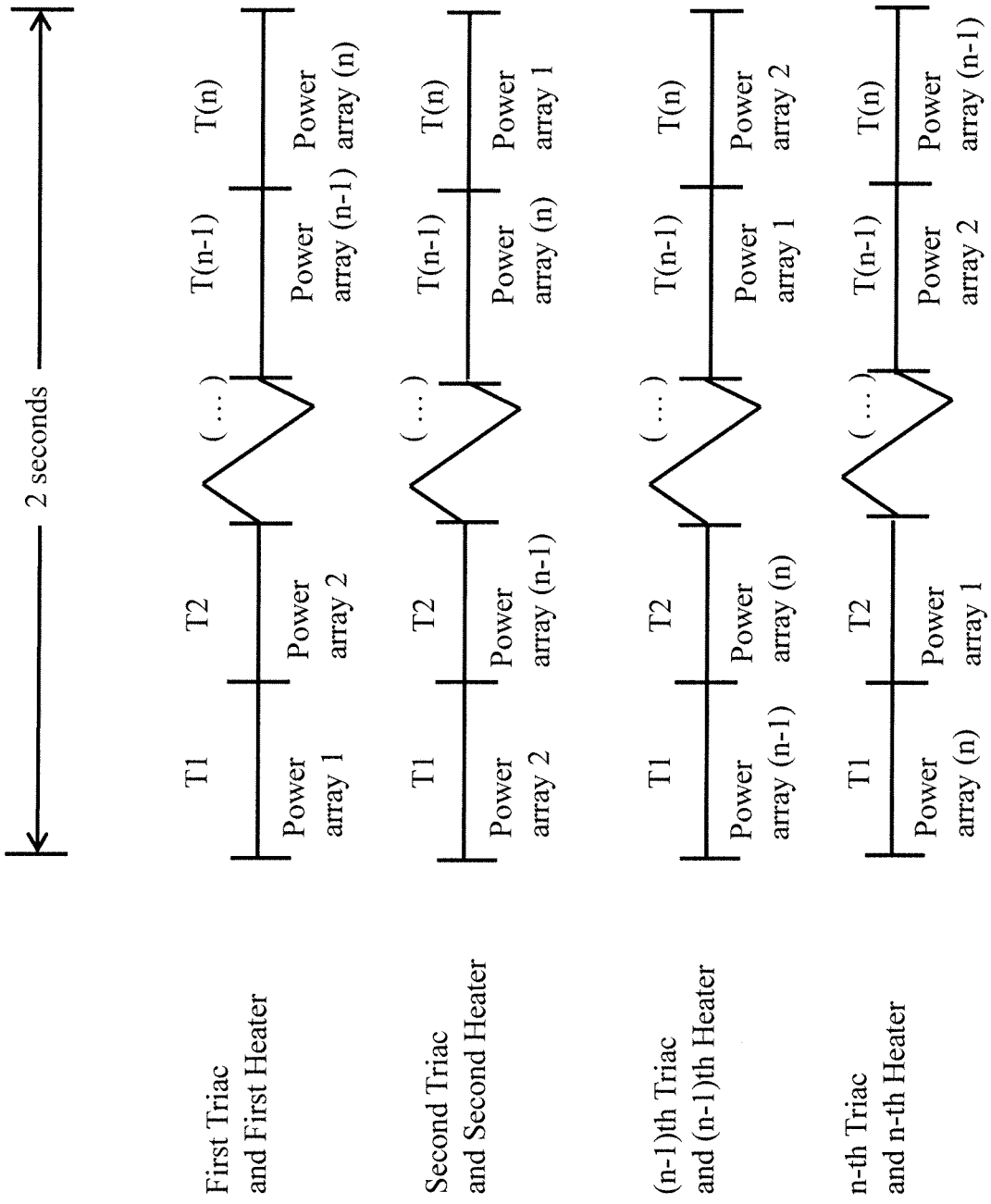
FIG. 9 shows exemplary power delivered to n-number of heating units of the present invention.

Embodiments of the present invention may be scaled to independently deliver power to more than two loads. In an embodiment where a digital power supply independently controls "n" number of loads, n power arrays are required. Moreover, the decision at 604 would compare the total power to 100%/n. The technique for filling the power arrays of FIG. 7 remains applicable, although rather than multiply by eight (8), it would be necessary to multiply step 702 by (n*4). Moreover, at steps 615 and 616, n time periods are required. FIG. 9 shows the timing of n-power arrays delivered across n-time periods. It should be understood that embodiments with multiple heaters without independent control are also contemplated by this disclosure.

The present inventions also provide methods for independently controlling two heating elements and providing variable power while providing reduced harmonic currents and flicker. In an embodiment of the invention, a user activates electric grill 110 and selects a first and second power level, for example by controlling knobs 101 and 102. By activating an electric grill 110, a user controls microprocessor 213 to execute the following steps for the benefit of controlling one or more heating elements. It is understood that some embodiments may include any number of knobs or other user inputs, including wirelessly. By activating the electric grill 110, a user turns on microprocessor 213. Microprocessor 213 receives the user's selected power settings and performs the above-described calculations to activate triac drivers 211 and 212 in a control pattern that delivers phase-controlled wave forms to heating elements 203 and 204.

In embodiments of the invention, microprocessor 213 performs the step of calculating the appropriate phase controlled wave forms by populating two power arrays 605-608. Each power array may have four cells. Each cell contains a number "n," where 0.0≤n≤1.0. The number "n" represents a wave form having "n"-percentage of power. The waves are cut to eliminate "excess" power. Microprocessor 213 performs the step of filling in the power arrays by calculating the total power requested by all heating elements 203, 204, which may be expressed as a percentage of selected power as compared overall available power (in decimal form).

If the total power requested (i.e. the total requested power for all heating elements) by the user is less than 50% of the overall available power, microprocessor 213 performs the step of filling in the first power array (605). The power array is populated by distributing the total power number into the power arrays four cells. At 606, microprocessor 213 performs the step of filling all zeros into the second power array (i.e. "0000"). If the total power requested by the user is greater than, or equal to, 50% of the overall power, microprocessor 213 performs the steps of fillings the first power array with 1's (i.e. "1|1|1|1") and the second power array is filled (with Total Power−50%, i.e. [702] minus 4) according to the steps of FIG. 7.

Once the first and second power array are calculated, microprocessor 213 delivers wave forms corresponding to the cells of each power array. In particular, each cell's value represents the percentage of power to deliver in one wave cycle. To deliver a wave having any given percentage of power, microprocessor 213 calculates a phase angle=arccos (2*x−1), where x is the power percentage described in any given cell. Microprocessor 213 uses the calculated angle to deliver an "on" signal to triac Drivers 211 or 212 at a point in time corresponding to the calculated phase angle. Microprocessor 213 may use a zero crossing signal and the above-described Table 1 to determine the correct timing.

Microprocessor 213 repeatedly delivers the first power array to the first triac driver 211 and the second power array to the second triac driver 212 for a time period T1. After T1 has passed, microprocessor 213 "flips" the first and second power array for a time period T2. In other words, as seen in FIG. 8, after T1 ends and T2 begins, the first power array is delivered to the second triac driver 212 and the second power array is delivered to the first triac driver 211.

Microprocessor 213 performs the step of calculating T1 and T2 as:

$$T1=2 \text{ seconds}*(\text{First heater total power/Combined heater total power})$$

$$T2=2 \text{ seconds}*(\text{Second heater total power/Combined heater total power}).$$

Mathematically, it follows that the power delivery phase of T1+T2=2 seconds.

In this way, the power arrays are delivered for a combined power delivery phase of 2 seconds. It is contemplated that longer or shorter power delivery phases may be used. After 2 seconds, microprocessor 213 may re-calculate the power arrays. By re-calculating the power arrays, microprocessor 213 may account for a change in user settings, or to switch from raising a heating element's temperature to maintaining a temperature.

An operating example applying the devices and methods described above is provided. For example, a user may wish to use the grill 110 with different power levels for the first and second heating elements 203 and 204—for instance, microprocessor 213 may determine that a first heating element 203 should have 17.5% of its maximum power, and a second heating element 204 should have only 5% of its maximum power. In accordance with the embodiments described herein, microprocessor 213 is configured to deliver 17.5% and 5% power, respectively, while drawing power in a pattern that reduces the harmonic currents introduced by the electric grill into the AC wall outlet.

In this example, the first and second power arrays are calculated as follows: the first and second selected power levels are combined to arrive at a total selected power: 17.5%+5%=22.5%, or 0.225 (See 603). Because this is less than 50%, microprocessor 213 proceeds with step 605. Using the techniques described herein, microprocessor 213 multiplies by eight (8) to arrive at 0.225*8=1.8. Next, microprocessor 213 fills the value 1.8 into the first power array. In particular, the first cell and third cells receive the value of (1.8)/2=0.9. The second and fourth cells remain "0." Thus, the first power array is "0.9|0|0.9|0" and the second power array is "0|0|0|0."

For a time period T1, the first power array is delivered to the first triac driver 211 and the second power array is simultaneously delivered to the second triac driver 212. In delivering the first and second power array, microprocessor 213 sends an "on" signal to the respective triac driver 211 and/or 212 at a time that corresponds to the "cut" of the wave. For example, the first power array's first cell dictates that a 90% power wave (i.e. 0.9) is delivered. A 90% power wave requires a "cut" angle of arccos (2*0.9−1)=36.86°. Microprocessor 213 delivers a 90% power wave by turning triac driver 211 "on" at 36.86°. Similar to the values of Table 1, a 36.86° cut can be made by delivering power 0.0017 seconds after a zero crossing. Subsequently, the second cell dictates that an "off" wave having 0% is delivered. The third wave is the same as the first wave, i.e. cut at 36.86°, and the fourth wave is the same as the second wave, i.e. "off." The second power array in this example is "0|0|0|0," thus the second triac driver 212 is never activated.

This delivery pattern is continued for a time period T1 as described at 612 and 613. Here, T1 is calculated as T1=2 seconds*(First heater total power/Combined heater total power)=2*(0.175/0.225)=2*0.78=1.56 seconds. Similarly, T2=2*(0.05/0.225)=0.44 seconds. In this example, the first power array ("0.9|0|0.9|0") is delivered to the first heating element 203 and the second power array ("0|0|0|0") is delivered to the second heating element 204 for T1=1.56 seconds. After 1.56 seconds, microprocessor "flips" the delivery of the first and second power array for a period of 0.44 seconds. After a combined 2 seconds have passed, microprocessor 213 may begin by re-filling the first and second power array according to the power needs at that point in time.

Figure 10:
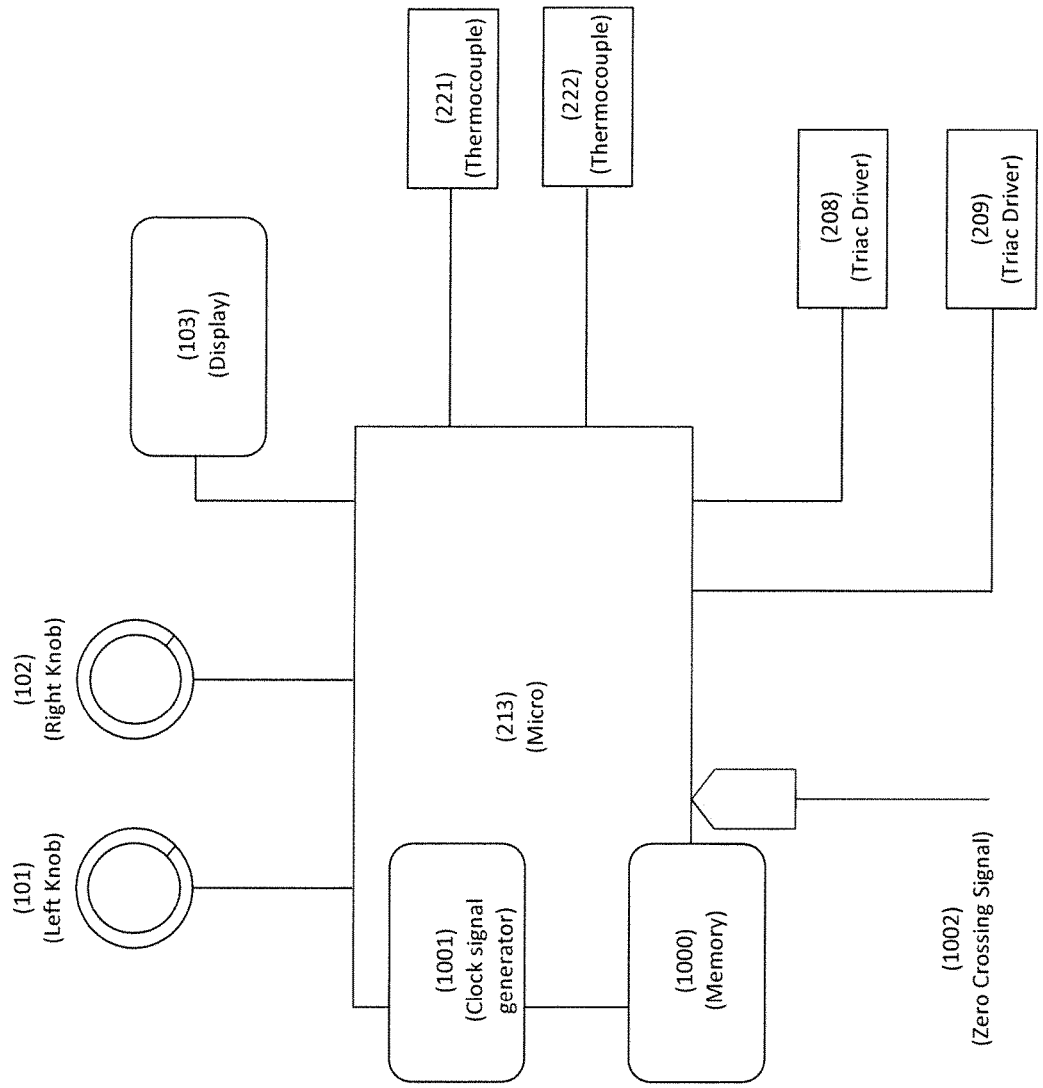
FIG. 10 is a flow chart of exemplary inputs and outputs to a microprocessor of the present invention.

It will be understood that microprocessor 213 may include internal or external memory 1000 for reading and/or writing in connection with executing the steps and configurations described herein. Moreover, it will be understood that microprocessor 213 may have an internal or external clock signal that may be used to time the "on" signal sent to a triac. The clock signal may be generated by an on-board clock signal generator 1001, or by an external clock. FIG. 10 is an exemplary schematic showing inputs and outputs to microprocessor 213. Examples include a left and right knob 101, 102 and a display 103. Additional examples include thermocouples 221, 222, and communication with triac Drivers 208 and 209. Memory 1000 and clock 1001 are also shown, as is the input signal 1002 from zero crossing unit 210.

Figure 11:
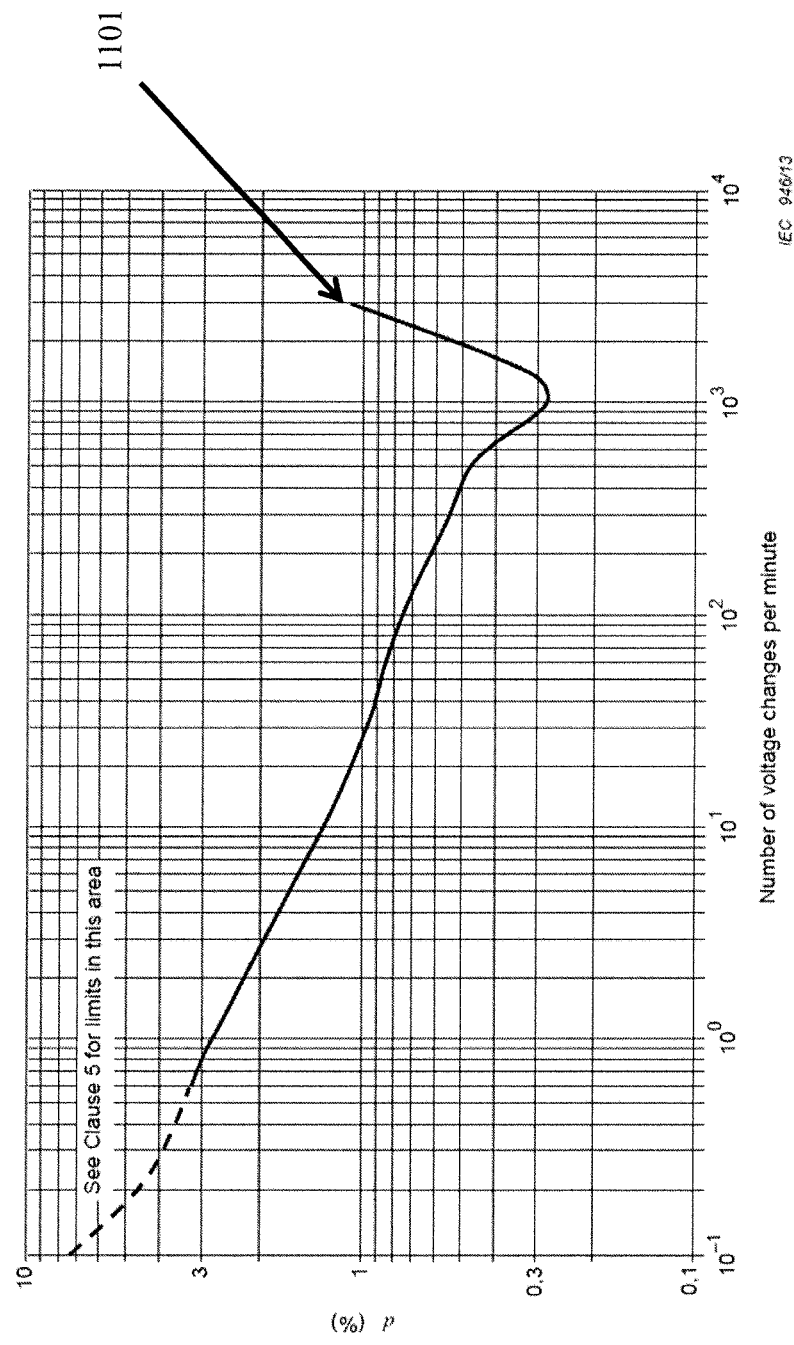
FIG. 11 shows standard (IEC 61000-3-3) limits for flicker.

An additional benefit of embodiments of the devices and methods described herein is a reduction in flicker introduced by the digital power supply 200 into a wall outlet. Flicker is undesirable because, at certain frequencies, it will cause lights connected to an outlet to flicker or dim. FIG. 11 shows the flicker limits of IEC 61000-3-3 Electromagnetic compatibility (EMC)—Part 3-3 (Voltage Fluctuations and Flicker). Flicker is measured as a % change in voltage.

Embodiments of the present invention may reduce flicker levels to a wall outlet based on voltage changes resulting from wave-cuts within a single power delivery phase. A person of skill in the art will recognize that flicker is commonly measured during a devices "steady state."

The voltage changes within a single power deliver phase comply with the flicker regulations. As seen at 1101 (and further described in the standard), the IEC 61000-3-3 requirement's last data point occurs at 2875 voltage changes per minute. This equates to a cycling frequency of 23.96 Hz. In other words, voltage changes occurring at a frequency above 23.96 Hz have no flicker requirement because they are beyond human perception. Embodiments of the devices and methods disclosed herein create a wave pattern in which electric grill 110 alternates between a cut wave and a full "on" or a full "off" wave. Following this pattern, electric grill 110 would create 25 voltage changes per second (25 Hz) at 50 Hz AC and 30 voltage changes per second (30 Hz) at 60 Hz AC. A cut wave followed by a full wave counts as one voltage change. The 25 Hz and 30 Hz cycling frequencies are above the standard's last data point of 23.96 Hz and therefore comply with flicker requirement.

An additional benefit of embodiments of the invention comes from splitting power into multiple power arrays and delivering them to multiple heating elements. Using the techniques described in FIGS. 6 and 7, one of the power arrays will always be "0|0|0|0" or "1|1|1|1." This ensures that only one of heating element 203 or 204 can receive a "cut" wave at any given time. As a result, the electric grill 110's used current (or power) will never be dropped by more than half (½) of the maximum rated power. To give an example, if two heating elements 203 and 204 each draw 1150 Watts, for a combined 2300 Watts drawn by the electric grill 110, then even a 90° in one heating element 203 or 204 would only result in a maximum power drop of 1150 Watts. This helps reduce the magnitude of harmonic currents.

Alternative configurations and methods for independently delivering power to two or more loads, such as heating elements 203, 204, while still satisfying flicker and harmonic requirements, are also disclosed herein. For example, in embodiments where it is not necessary to deliver fully variable power (i.e. ranging continuously from 0 to 100%), microprocessor 213 may be configured to deliver discrete values—such as 0%, 50%, or 100% power—to each heating element (independently). In such an embodiment, it is not necessary to perform the power array calculations described in FIGS. 6 through 9, and their associated text. As disclosed herein, compliance with flicker and harmonic requirements may still be achieved using discrete power delivery. Microprocessor 213 may be configured to deliver combinations of 0%, 50%, or 100% independently to two heating elements, thereby avoiding any phase cuts which introduce flicker or harmonic distortion.

Figure 12:
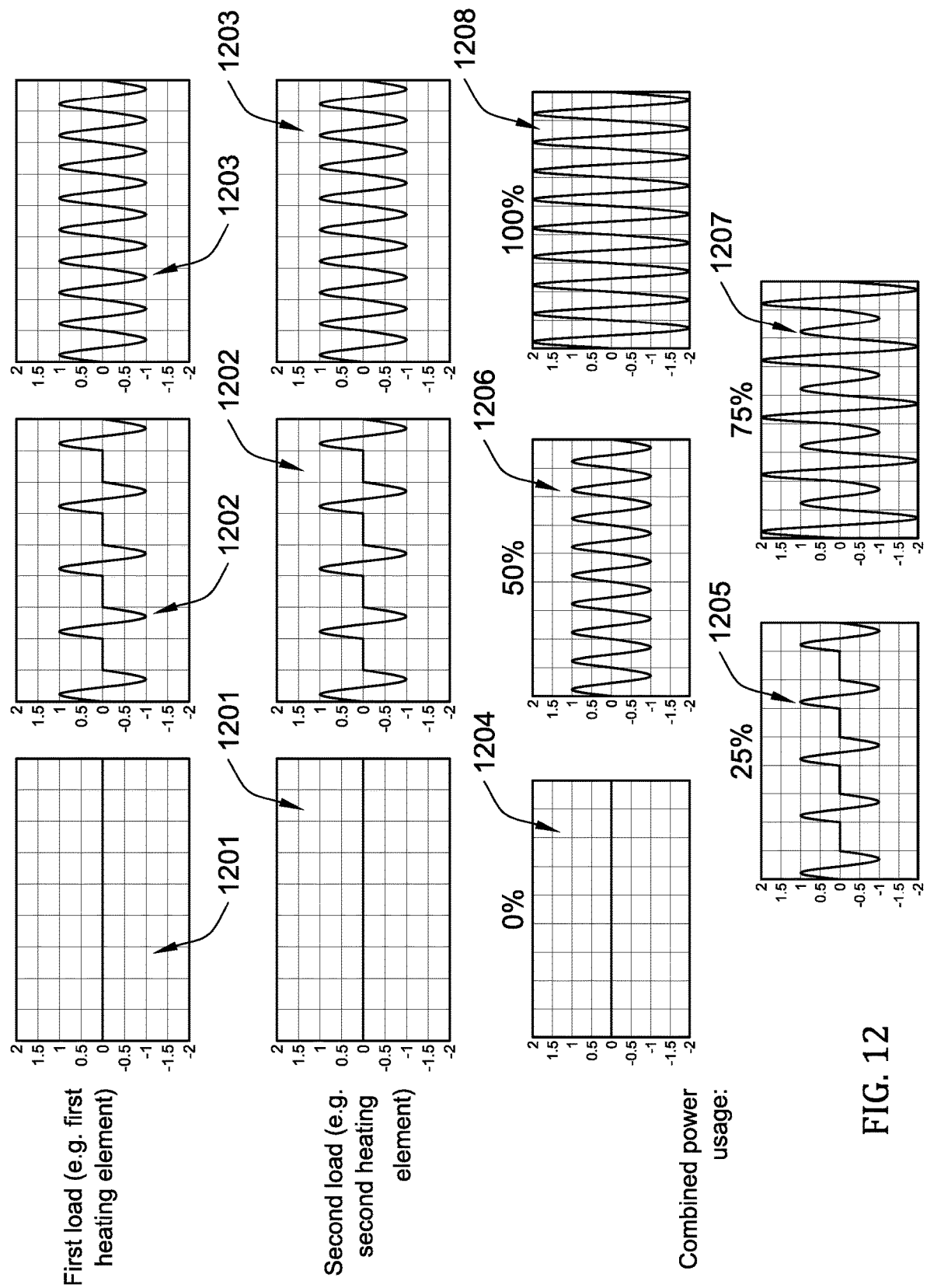
FIG. 12 shows exemplary wave forms for the first load, second load, and the combined power usage.

More specifically, FIG. 12 illustrates how microprocessor 213, and electric grill 110 generally, deliver power to heating elements 203, 204 using discrete power levels, without introducing phase cuts into the electrical system. For example, the wave form 1201 shows 0% power delivery. Wave form 1202 shows 50% power delivery, which microprocessor 213 delivers by controlling current delivered to heating elements 203, 204 (e.g. delivering alternating "on" and "off" waves). More specifically, in the wave forms 1202, microprocessor 213 delivers 50% power by delivering one full wave cycle, and then "skipping" the next wave. Thus, only one wave is delivered in every two cycles, which amounts to 50% power delivery. The waveforms of 1203 show full power delivery, during which microprocessor 213 delivers full wave forms.

The waveforms 1204 through 1208 show the combination of 0%, 50%, or 100% power to each of the two heating elements. For example, if two heating elements are both operating at 0% power, the combined power usage (e.g. the combined power profile for electric grill 110) is 0, i.e. a flat line, as seen in wave form 1204. When one heating element is operating at 0% and the other is operating at 50%, the combined power profile is 25%—seen in waveform 1205, where the wave amplitude is half of the maximum, and every second wave is skipped. A person of skill in the art will recognize that such a waveform amounts to 25% of the available power.

The waveform of 1206 represents a device (for example electric grill 110) drawing 50% of available power. This scenario occurs where both heating elements are drawing 50% power, or where one heating element draws 100% power and the second heating element draws 0% power. Although not necessarily visible from the scale of waveforms 1202, it should be understood that a first and second heating element, both operating at 50% power, would receive alternating waveforms. In other words, microprocessor 213 delivers a wave form to the first heating element, and delivers the next wave form to the second heating, and so forth. The alternating pattern creates a smooth overall power usage profile, as seen in 1206.

The waveform of 1207 represents 75% overall power usage, which may occur when one heating element is drawing 100% power and the second is drawing 50% power, or vice versa. As seen in 1207, waves having full amplitude and half amplitude are alternating, which provides a combined 75% power delivery. Lastly, the waveform of 1208 shows an overall 100% power usage, which occurs when both heating elements are operating at 100%. The waveform of 1208 has double the amplitude of the 50% power delivery in 1206.

Embodiments of the disclosed digital power supply and method for delivering power may optionally be implemented in the circuitry of an electric grill. FIG. 2A shows additional components that may optionally be added to the protection circuitry 200 to provide circuitry for an electric grill. For example, line 201 and neutral 202 may connect to a step down transformer 215 to which zero crossing detection unit 210 is connected. Step down transformer 215 provides a reduced secondary voltage so that zero crossing detection unit 210 may detect zero crossings in AC current between line 201 and neutral 202 without being exposed to high voltages.

Further optional embodiments include a full wave rectifier 216 that feeds to a ground fault detection unit 217, which in turn communicates with a trip controller 218 for tripping an electromechanical latch 206 or 207 (see FIG. 2A). Ground fault detection unit 217 may receive a signal indicating a current imbalance between line 201 and neutral 202 and cause the latches to trip to prevent hazardous current situations.

Additional optional embodiments include a watchdog monitor 220 which monitors the operation of microprocessor 213 and may disable triac drivers 211 and 212 in the event of a failure of microprocessor 213. Also provided are AC/DC power converters 214 which may be used to power the microprocessor 213, and a current sensor, such as Hall Effect sensor 219, which may be used by microprocessor 213 to monitor the current flowing to heating elements 203 and 204.

FIG. 2B further discloses relays 225 and 226, which are configured in parallel with TriACs 208 and 209, respectively. Relays 225 and 226 are controlled via control line (not shown) by microprocessor 213 for controlling the delivery of current to heating elements 203 and 204, respectively. Because of the parallel configuration between relays 225, 226 and TriACs 208, 209, current can be delivered to the heating elements 203, 204 by activating either a relay or a TriAC. Stated another way, microprocessor 213 can use either the respective TriAC 208, 209 or the respective relay 225, 226 to deliver current to heating elements 203, 204.

An advantage of having two components (a relay and a TriAC) which can each deliver current to the heating elements 203, 204, is that microprocessor 213 can alternate between the two components to reduce heat generation. For example, delivering 100% power to heating elements 203, 204 may cause TriACs 208, 209 to overheat when active. More specifically, heating elements 203, 204 may draw a relatively high amount of current when a high temperature is desired, and delivering said current through TriACs 208, 209 for a prolonged period of time may cause TriACs 208, 209 to overheat and eventually deteriorate. To avoid this, microprocessor 213 may deactivate TriACs 208, 209 and instead activate relays 225, 226 when delivering a "HIGH," or relatively high, current to heating elements 203, 204. Current then flows to heating elements 203 and/or 204 through relays 225 and/or 226, respectively, thereby protecting TriACs 208, 209 from overheating.

In an embodiment where the disclosed digital power supplies are used in an electric grill, it may be desirable to achieve and maintain a desired target temperature. A band controller 223, seen in FIGS. 2A-B, may be provided for achieving and maintaining a desired target temperature. FIGS. 2A-B further show an embodiment of microprocessor 213 having the functionality of band controller 223. A person of skill in the art, having the benefit of this disclosure, will understand that band controller 223 may be a physical and/or virtual subcomponent of microprocessor 213, or may alternatively be a separate hardware and/or software component. In embodiments of the inventions, band controller 223 may be configured to receive a target temperature via a user input, and to control the amount of power (i.e. current) delivered to heating elements 203, 204 to achieve the user-selected target temperature.

Band controller 223 may use hardware and software applications to achieve and maintain target temperatures at heating elements 203, 204 by controlling the amount of current delivered. Band controller 223 may receive feedback from thermocouples 221, 222, which may be positioned proximate to heating elements 203, 204, and use such feedback to determine when a target temperature has been achieved. In embodiments of the inventions, it may be desirable to estimate the ambient temperature within a grill's cook box using thermocouples 221, 222. There are scenarios in which the ambient temperature (e.g. the temperature at a position of six or eight inches above the heating elements) may not be identical to the temperature at heating elements 203, 204, especially when operating at higher temperatures. Because food may be positioned throughout a grill's cook box, for example on a grate six or eight inches above heating elements 203, 204, it may be desirable for band controller 223 (and/or microprocessor 213) to operate based on an estimated ambient temperature, rather than the temperature at heating elements 203, 204. Operating based on the ambient temperature provides a more precise measurement of a food's temperature, and therefore a more precise measurement of a food's doneness.

Figure 13:
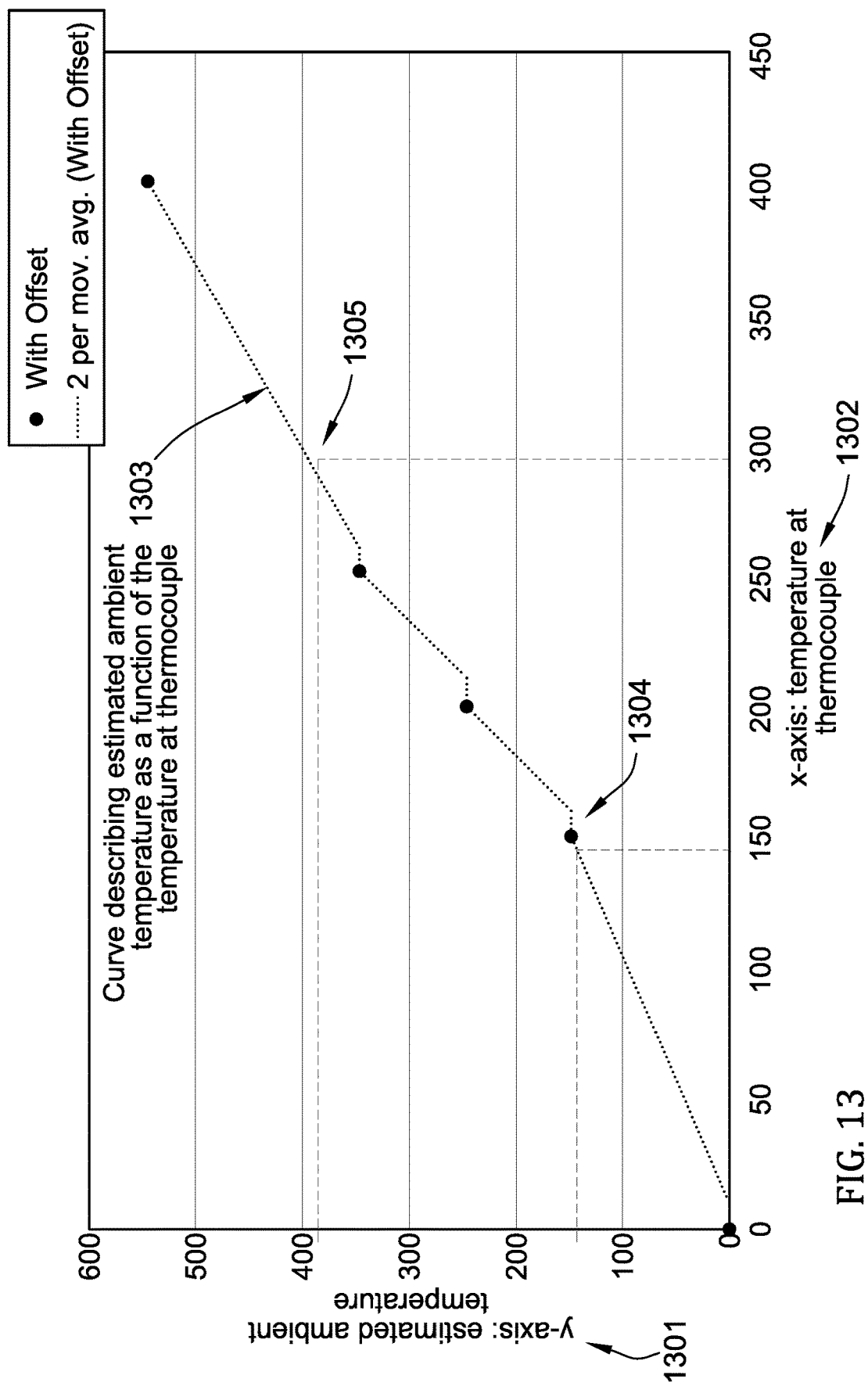
FIG. 13 is an exemplary graph showing estimated ambient temperatures inside a grill box based on measurements taken near a grill's heating elements.

By way of example, FIG. 13 shows Applicants' test data for accurately estimating the ambient temperature 1301, based on the temperature 1302 at thermocouples 121, 122. On its x-axis, FIG. 13 shows a temperature 1302 measured at thermocouples 121, 122. On its y-axis, FIG. 13 shows a corresponding estimated ambient temperature 1301. The curve 1303 shows the estimated ambient temperature (y-axis) as a function of the measured temperature (x-axis). The estimated ambient temperature of FIG. 13 was measured a few inches above a heating element, at a position where a user may configure a cooking grate. It becomes clear that, at higher temperatures, the ambient temperature diverges from the measured temperature at the thermocouples—in other words, at higher temperatures, the estimated ambient temperature at a position above a heating element rises faster than the temperature of the heating element. By way of example, at reference point 1304, the estimated ambient temperature and the temperature at the thermocouples 1302 are both roughly equal, at 150 F. At a higher temperature (e.g. reference point 1305), the temperature at the thermocouple may be 300 F, whereas the estimated ambient temperature has risen to approximately 400 F. Thus, at higher temperatures, a higher offset is required in order to accurately estimate the ambient temperature.

Using the offsets indicated by FIG. 13, microprocessor 213, and/or band controller 223, may be adapted and configured with hardware and/or software to calculate an estimated ambient temperature based on a measured temperature at thermocouples 221, 222. It should be understood that the offsets of FIG. 13 are provided as an example only, and may be increased or decreased depending on factors such as the height of a cooking grate, and other factors which may affect ambient conditions. Moreover, microprocessor 213 and/or band controller 223 may use such an estimated ambient temperature as part of a feedback loop to determine when a target temperature is reached. In other words, in some embodiments, a target temperature may refer to the estimated ambient temperature, and in other embodiments it may refer to the temperature at thermocouples 221, 222.

It is contemplated that yet further embodiments may use a food probe (not shown) to measure a food's temperature and determine when a target temperature is reached based on a temperature reading from the food probe. A food probe is a temperature sensing device which may be inserted by a user into a food—such as a steak or a chicken breast—to measure the food's internal temperature. Using a food probe to sense temperature may be advantageous to some cooking styles because it can provide an accurate determination of a food's internal temperature, and by extension its doneness.

To consistently maintain a target temperature, band controller 223 may determine temperature "bands" surrounding a given target temperature, where said bands indicate the amount of power (i.e. current) to deliver to a heating element 203, 204 as a target temperature is approached. In embodiments of the inventions, the bands create zones representing 0%, 50%, and 100% power. The zone above 1401 represents a temperature zone in which 0% power is delivered; the zone between 1401 and 1403 represents a zone in which 50% power is delivered, and the zone below 1403 represents 100% power delivery. Band controller 223 uses the bands to determine an appropriate power (e.g. electric current) to deliver to a heating element to achieve and maintain the desired target temperature. By way of example, seen for example in FIG. 14A, band controller 223 may deliver 100% power until a desired target temperature 1402 is achieved, and then reduce power to 50% until an upper band 1401 is reached. If the upper band 1401 is exceeded, band controller 223 reduces power to 0%. If the temperature drops to (or below) a lower band 1403, power is again increased to 100%. Band controller 223 continuously receives feedback from thermocouples 221, 222, and compares the feedback (in some embodiments, the estimated ambient temperature described above) to appropriate temperature bands. In this way, temperature fluctuates between lower band 1403 and upper band 1401, and approximates the target temperature.

Figure 14A:
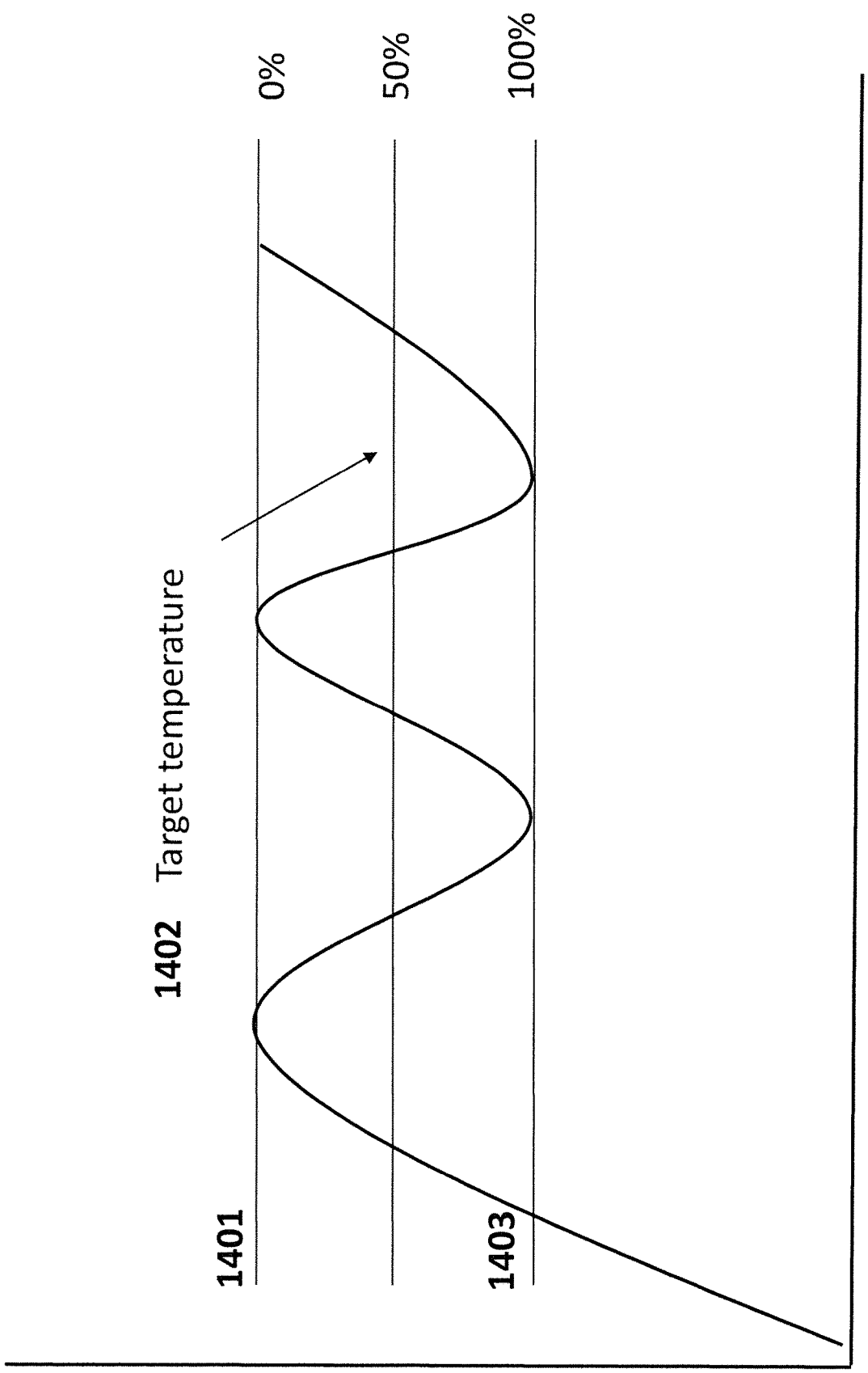
FIG. 14A is a graph showing exemplary temperature fluctuations of an electric grill operating in a medium temperature range.
Figure 14B:
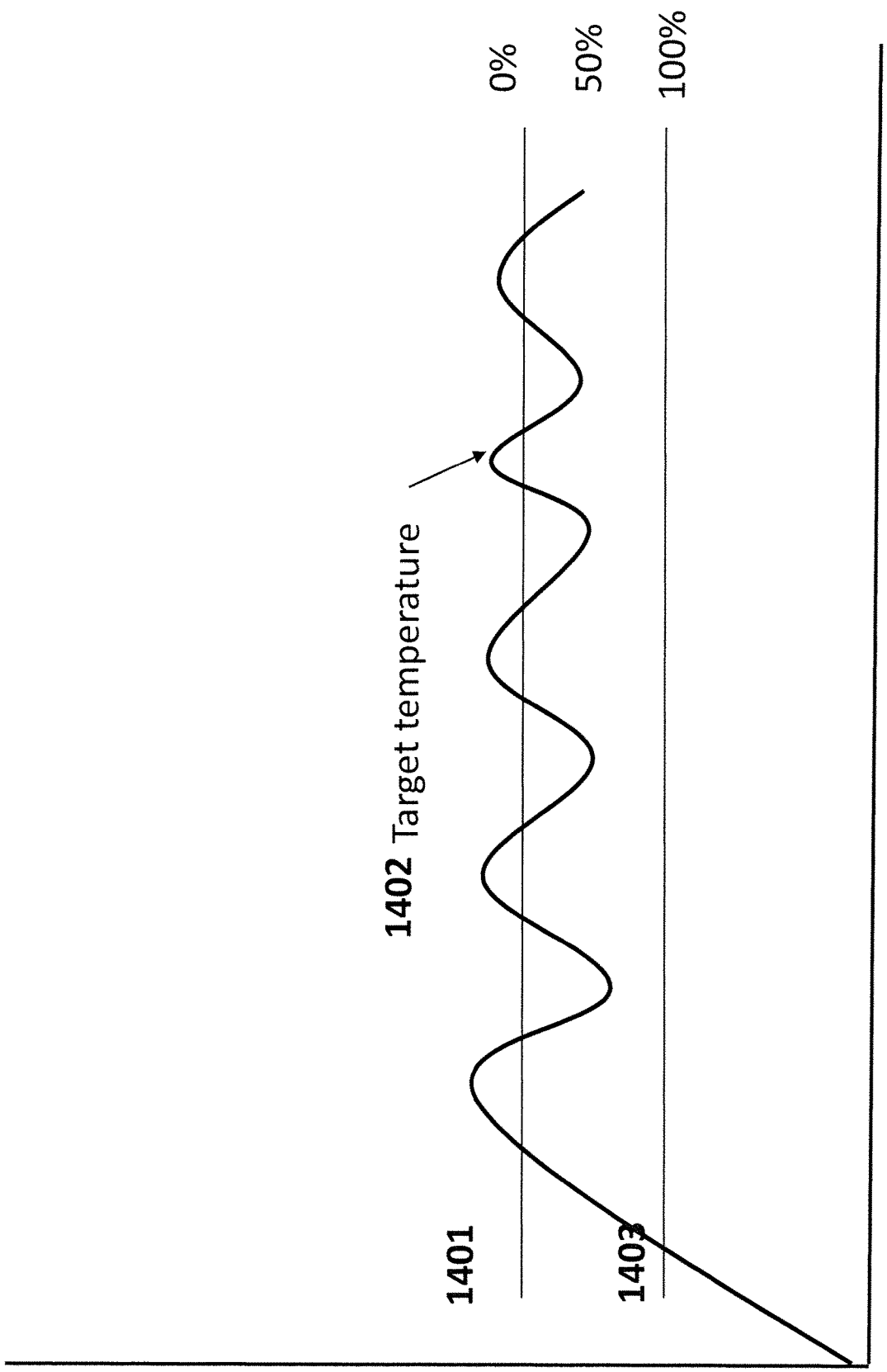
FIG. 14B is a graph showing exemplary temperature fluctuations of an electric grill operating in a low temperature range.
Figure 14C:
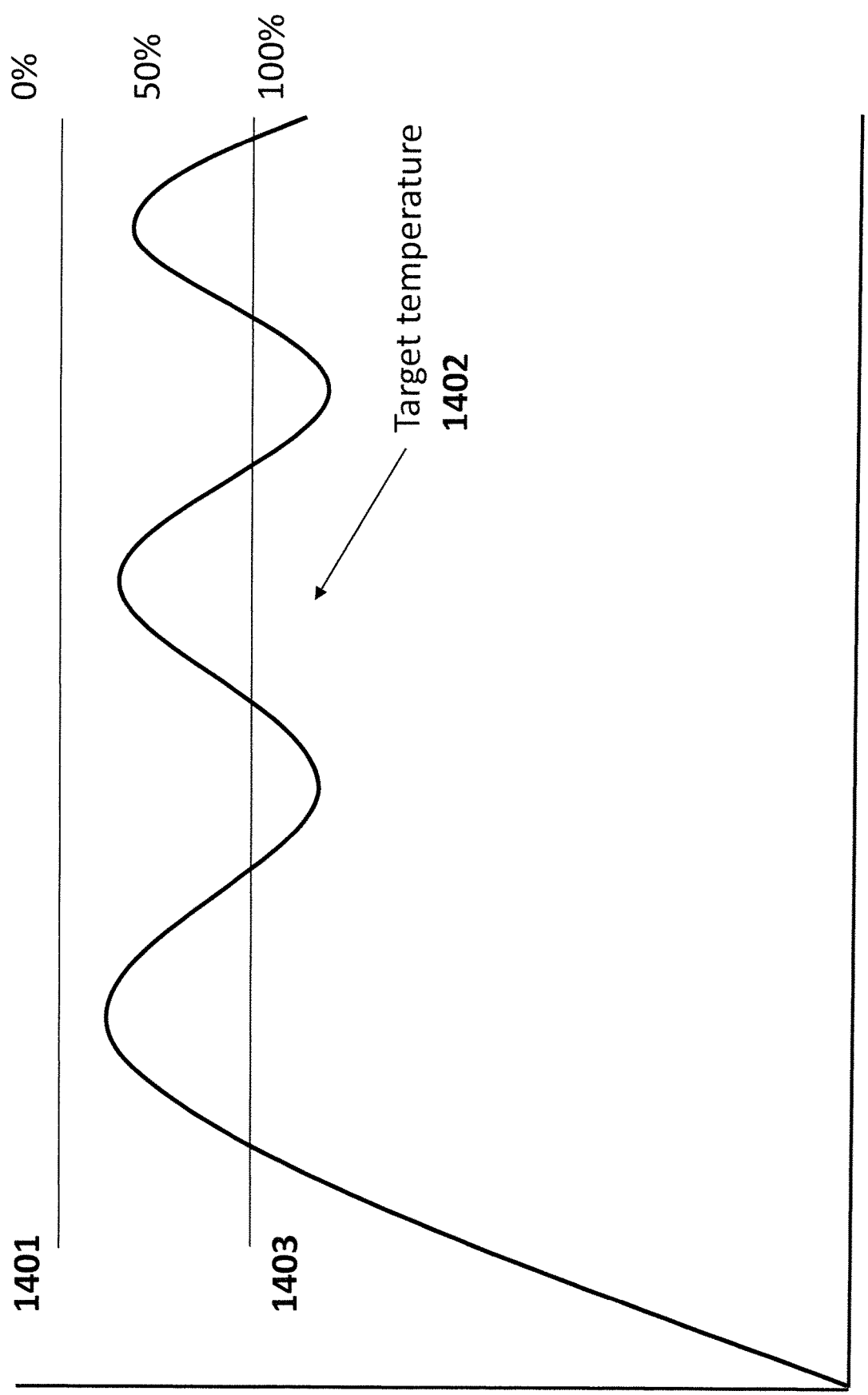
FIG. 14C is a graph showing exemplary temperature fluctuations of an electric grill operating at a high temperature range.

Moreover, in embodiments of the invention, band controller 223 dynamically shifts the bands depending on the desired target temperature. Dynamically shifting the temperature bands allows for more precise temperature control, allowing a user to approximately maintain the selected target temperature. This occurs because, at lower temperatures, a 50% power setting may cause the electric grill's temperature to continue increasing past the desired target temperature. On the other hand, at higher temperatures, delivering 50% power may cause the temperature to begin dropping. Therefore, band controller 223 may compensate by lowering the lower power band 1403 for a lower desired target temperature. On the other hand, at a higher temperature range, band controller 223 may shift the bands higher. An example of lowered temperature bands corresponding to a lower desired target temperature is shown in FIG. 14B. In FIG. 14B, a lower target temperature has been selected, and band controller 223 shifted the upper power band (1401) to correspond to the target temperature. Conversely, FIG. 14C shows a relatively high target temperature, for which band controller 223 raised the power bands such that the target temperature coincides with the 100% power band (1403). In FIG. 14B, the target temperature overlaps with the power band 1401; whereas in FIG. 14C the target temperature overlaps with the power band 1403. Exemplary values for power bands are provided in the following table:

| Desired target temperature (T) | Lower temperature band (100%) | Upper temperature band (0%) |
| --- | --- | --- |
| T < 250 F. | T − 25 F. | T |
| 250 F. < T < 400 F. | T − 10 F. | T + 10 F. |
| 400 F. < T | T | T + 15 F. |

Figure 15:
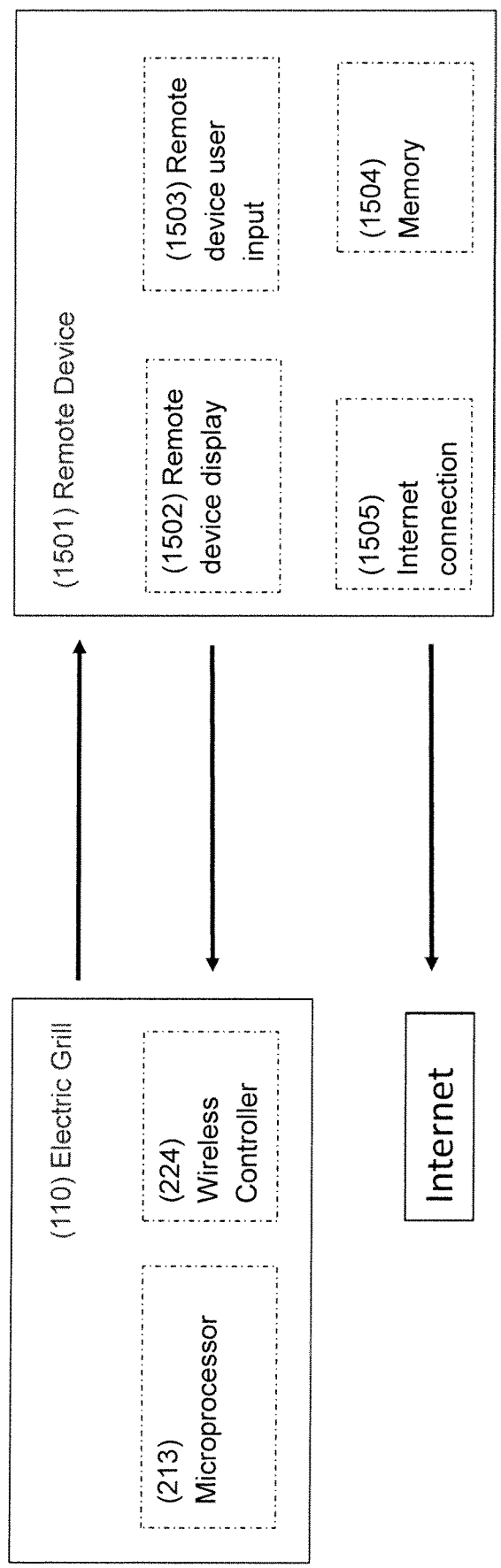
FIG. 15 is an exemplary schematic of an electric grill in wireless communication with a remote device.

In embodiments having multiple heating elements capable of independent operation, users can input multiple target temperatures. For example, an embodiment having two independent heating elements 203, 204, may receive two separate target temperatures, each corresponding to one heating element. Target temperatures may be communicated to band controller 223 through any number of possible user inputs. By way of non-limiting examples, possible user inputs include knobs 101, 102. User inputs can also be received wirelessly, via wireless controller 224, from a wireless device configured to communicate with wireless controller 224. In such an embodiment, wireless controller 224 may be configured to wirelessly communicate with a remote device via Wi-Fi, Bluetooth, radio frequency, or any other form of wireless communication. Remote devices include cell phones, tablets, laptops, computers, and any other form of device capable of wireless communication. FIG. 15 shows an exemplary remote device 1501, having a display 1502 and user input device 1503, communicating with the electric grill 110's wireless controller 224. In a non-limiting example, remote device 1501 may be a cell phone with a touch screen as its input device 1503. Regardless of the type of device used, it is contemplated that remote device 1501 may be configured to receive a user input representing one or more target temperatures, and wirelessly communicate said target temperature to electric grill 110 via wireless controller 224.

In exemplary embodiments, remote device 1501 may be adapted and configured to directly receive a desired target temperature from a user. In such embodiments, a user can use input device 1503 to select a target temperature. In other exemplary embodiments, remote device 1501 may be adapted and configured to receive a user input selecting a type of meat to be cooked, and a desired doneness, and to determine the appropriate target temperature for the user's selection. In such embodiments, remote device 1501 may have a memory 1504 storing the appropriate target temperature associated with a desired food profile. A user thus uses input device 1503 to select a food profile, and remote device 1501 wirelessly communicates the associated target temperature. In addition to controlling target temperatures, embodiments of remote device 1501 are adapted and configured to send an "on" and/or "off" signal wirelessly, via wireless controller 224, to microprocessor 213 and/or band controller 223. As such, a user can control both the desired target temperature of the electric grill 110, as well as turning it on and off.

Additional examples of wireless communication between remote device 1501 and electric grill 110 (via wireless controller 224) include the ability to control settings for display 103 remotely, from remote device 1501. Thus, remote device 1501 may be adapted and configured to wirelessly control the information displayed on electric grill 110's display 103. Remote device 1501 may control which information is displayed on display 103, and allow a user to toggle between (C) Celsius and (F) Fahrenheit with respect to temperature measurements. Such information may include the electric grill 110's current temperature, ambient temperature, target temperature, as well as timers indicating how long the grill has been active, how long a food has been cooking, or how much time remains until a food reaches its target temperature. Such information may further be wirelessly transmitted from electric grill 110, via wireless controller 224, to remote device 1501.

In turn, remote device 1501 may provide such information to a user on a remote device display 1502, and may further use said information to wirelessly turn electric grill 110 off, or reduce its desired target temperature, if a predetermined temperature has been reached, or if a food has been cooking for a predetermined time period. In exemplary embodiments, food profiles are stored in memory 1504, where such food profiles indicate either the appropriate target temperature and/or an appropriate cooking time for a given food. Remote device 1501 may monitor information received wirelessly from electric grill 110 and determine if an appropriate temperature or cooking time has been reached. Remote device 1501 may also be adapted and configured to turn off electric grill 110 once that happens, and/or to provide an audible or visual alert. Such an audible and/or visual alert may be provided on the remote device 1501, at the electric grill 110, or both.

Moreover, it is contemplated that embodiments of the inventions may use wireless communications to deliver error codes from the electric grill 110 to a remote device 1501, where said error codes may be indicative of an unsafe current condition as described further herein. Delivering error codes to a remote device 1501 has the advantage of allowing a user to remotely understand when an unsafe current condition has occurred, and remote device 1501 may further display safety tips for correcting the unsafe current condition as well as recording the conditions that lead to the unsafe condition.

Error codes may be determined by microprocessor 213 acting in conjunction with the circuitry shown for example in FIG. 2. As described further herein, microprocessor 213 may be in communication, via control lines, with Ground Fault Detection Unit 217 and Hall Effect sensor 219. Thus, microprocessor 213 may be adapted and configured to receive a control signal from Ground Fault Detection Unit 217 indicating that a ground fault has been detected. Likewise, microprocessor 213 may be adapted and configured to use signals from Hall Effect sensor 219 to recognize errors in delivering current to heating elements 203 and 204. As described further herein, a reading of zero current from Hall Effect sensor 219 indicates that heating elements 203 and 204 are not receiving any current, whereas an unexpectedly high current reading indicates that too much current is flowing to heating elements 203 and 204 (e.g. an "over-current" scenario).

In embodiments of the inventions, microprocessor 213 is adapted and configured to recognize these errors and wirelessly communicate, via wireless controller 224, an error code corresponding to the error which occurred. For example, an error code of "01" may indicate that a ground fault has been detected; "02" may indicate that Hall Effect sensor 219 has determined that no current is flowing to heating elements 203 and/or 204; and "03" may indicate that Hall Effect sensor 219 detected an unexpectedly high current flowing to heating elements 203 and/or 204. In embodiments where microprocessor 213 is a chip including a "self-check" feature, an error code of "04" may be sent if the self-check pin determines a failure of microprocessor 213. A person of ordinary skill in the art will recognize that any variety of codes may be used to indicate each error. In response to an error, an audible or visual alert may be signaled at electric grill 110, including for example on display 103. Likewise, remote device 1501 may also provide an audible or visual alert upon receiving an error code. Additional disclosure relating to the identification and transmission of error codes is found in Applicant's co-pending application Ser. No. 15/200,687, titled Electric Grill with Circuit Protection Circuitry, filed on Jul. 1, 2016, and also the co-pending patent application entitled "Wireless Control And Monitoring For Electric Grill With Current Protection Circuitry," filed on the same day as this application, both of which are assigned to Weber-Stephen Products LLC, and which are hereby incorporated by reference in their entirety.

Remote device 1501 may be adapted and configured to wirelessly receive error codes and display, on display 1502, a message identifying the type of error to the user. Such an error message may be accompanied by an audible or visual alert at remote device 1501. Remote device 1501 may further be adapted and configured to display a message, saved in memory 1504, explaining steps that a user should take to correct the error. For example, as explained further herein, the circuitry of FIG. 2 may be configured to trip a relay 206 and/or 207 in response to a ground fault. Therefore, if microprocessor 213 sends an error code (e.g. "01") indicating a ground fault to remote device 1501, remote device 1501 may display a message alerting a user that a ground fault has occurred and prompting the user to reset relay 206 and/or 207.

In response to an error "02," remote device 1501 may be adapted and configured to alert the user that no current is flowing to heating element 203 and/or 204. The absence of current flowing may be indicative of an open circuit, which may occur, for example, if a heating element 203, 204 is not properly installed. Thus, remote device 1501 may display a message prompting a user to uninstall, and re-install, heating elements 203, 204. If the error persists, remote device 1501 may prompt the user to contact the manufacturer.

Similarly, if error code "03" is received, an over-current has occurred. One possible cause of an over-current may be that a user has installed an incompatible, or faulty, heating element having an incorrect resistance value. (A heating element with an incorrectly low resistance will cause an inappropriately high current to flow through it). For example, a heating element designed to work at 120V would have a resistance value that is too low to function at 230V, causing an overcurrent. Thus, a user may be prompted to check the heating element, or replace it with a new one.

Remote device 1501 may create a log of errors and store them in memory 904. Such an error log may include a recording of each error that occurred. Moreover, in embodiments where remote device 1501 receives status information (such as the temperature of heating elements, ambient temperature, temperature targets, cooking time, etc.) from electric grill 510, such status information may also be recorded in the error log. Status information may be delivered continuously, or in response to an error. By way of example, it may be advantageous to know how long a grill had been cooking before an error occurred, the grill's temperature at the time of an error, and other related information. An error log may be helpful in diagnosing errors. A person of skill in the art will understand that a wide variety of parameters may be recorded and stored as part of an error log.

In some embodiments, remote device 1501 may have an internet connection 1505. Internet connection 1505 allows remote device 1501 to optionally send a recorded error log to a third party, such as an electric grill's manufacturer. A manufacturer can therefore better understand the error that occurred and the conditions surrounding the error. This can lead to product fixes and improvements.

For the reasons described above, some embodiments of the inventions may provide a digital power supply that increases a heating element's lifespan; complies with flicker requirements, and also complies with harmonic requirements. These benefits may be accomplished using the devices and methods described herein. For example, using a power delivery phase of 2 seconds prevents the heating elements from ever fully expanding or fully contracting. Lengthy power delivery phases that allow a heating element to fully expand or contract are very detrimental to the heating element's lifespan. The flicker requirement is satisfied by creating a total power array that describes an alternating wave pattern which has a cycling frequency of 25-30 Hz depending on the AC current. Moreover, the total power array that may be created using devices and methods of the invention follow every cut wave with a full "on" or full "off" wave, thus reducing harmonic currents. Harmonic currents are also reduced by splitting the combined load of electric grill 110 to two or more elements.

The above description is not intended to limit the meaning of the words used in or the scope of the following claims that define the invention. Rather the descriptions and illustrations have been provided to aid in understanding the various embodiments. It is contemplated that future modifications in structure, function or result will exist that are not substantial changes and that all such insubstantial changes in what is claims are intended to covered by the claims. Thus, while preferred embodiments of the present inventions have been illustrated and described, one of skill in the art will understand that numerous changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:
1. A wireless electric grill system, comprising:
an electric grill, including:
a heating element connected through a triac to a voltage line;
a microprocessor in electronic communication with the triac, the microprocessor configured to deliver one of a plurality of discrete power levels to the heating element by activating or deactivating the triac;

at least one temperature sensing device configured to measure a sensed temperature at a position in the electric grill, the at least one temperature sensing device configured to electronically communicate the sensed temperature to the microprocessor;

a wireless controller in electronic communication with the microprocessor; and a band controller in electronic communication with the microprocessor and the wireless controller, the band controller configured to receive a desired target temperature from the wireless controller, the band controller further configured to determine an upper temperature band and a lower temperature band, a range between the upper temperature band and the lower temperature band being based on the desired target temperature;

wherein the microprocessor is configured to cause delivery of a first discrete power level when the sensed temperature is below the lower temperature band, to cause delivery of a second discrete power level when the sensed temperature is between the lower temperature and the upper temperature band, and to cause delivery of a third discrete power level when the sensed temperature is above the upper temperature band.

2. The wireless electric grill system of claim 1, wherein the first discrete power level is 100%, the second discrete power level is 50%, and the third discrete power level is 0%.

3. The wireless electric grill system of claim 1, further including a remote device in wireless communication with the microprocessor of the electric grill system using a radio frequency communication protocol, the remote device configured to receive a user input to select a type of food to be cooked and a desired doneness of the food to be cooked, and to wirelessly communicate an appropriate desired target temperature to the microprocessor of the electric grill system via the wireless controller.

4. The wireless electric grill system of claim 3, wherein the remote device includes a display and a user input device.

5. The wireless electric grill system of claim 4, wherein the display includes a touch screen, and the touch screen is configured to receive a user input representing one or more target temperatures, wherein the remote device is configured to wirelessly communicate the one or more target temperatures to the microprocessor of the electric grill system via the wireless controller.

6. The wireless electric grill system of claim 1, wherein the microprocessor of the electric grill system is configured to wirelessly transmit the sensed temperature to a remote device, and the remote device is configured to display the received sensed temperature on a touch screen of the remote device.

7. A wireless electric grill system, comprising:
an electric grill;
a heating element connected through a triac to a voltage line, at least a portion of the heating element being located within the electric grill;
a microprocessor in electronic communication with the triac, the microprocessor configured to deliver one of a plurality of discrete power levels to the heating element by activating or deactivating the triac;
at least one temperature sensing device configured to measure a sensed temperature at a position in the electric grill, the at least one temperature sensing device configured to electronically communicate the sensed temperature to the microprocessor, at least a portion of the at least one temperature sensing device being located within the electric grill;

a wireless controller in electronic communication with the microprocessor; and a band controller in electronic communication with the microprocessor and the wireless controller, the band controller configured to receive a desired target temperature from the wireless controller, the band controller further configured to determine an upper temperature band and a lower temperature band, a range between the upper temperature band and the lower temperature band being based on the desired target temperature;

wherein the microprocessor is configured to cause delivery of a first discrete power level when the sensed temperature is below the lower temperature band, to cause delivery of a second discrete power level when the sensed temperature is between the lower temperature and the upper temperature band, and to cause delivery of a third discrete power level when the sensed temperature is above the upper temperature band.

8. The wireless electric grill system of claim 7, wherein the first discrete power level is 100%, the second discrete power level is 50%, and the third discrete power level is 0%.

9. The wireless electric grill system of claim 7, further including a remote device in wireless communication with the microprocessor of the electric grill system using a radio frequency communication protocol, the remote device configured to receive a user input to select a type of food to be cooked and a desired doneness of the food to be cooked, and to wirelessly communicate an appropriate desired target temperature to the microprocessor of the electric grill system via the wireless controller.

10. The wireless electric grill system of claim 9, wherein the remote device includes a display and a user input device.

11. The wireless electric grill system of claim 10, wherein the display includes a touch screen, and the touch screen is configured to receive a user input representing one or more target temperatures, wherein the remote device is configured to wirelessly communicate the one or more target temperatures to the microprocessor of the electric grill system via the wireless controller.

12. The wireless electric grill system of claim 7, wherein the microprocessor of the electric grill system is configured to wirelessly transmit the sensed temperature to a remote device, and the remote device is configured to display the received sensed temperature on a touch screen of the remote device.

13. A wireless electric grill system, comprising:
an electric grill;
a heating element connected through a triac to a voltage line, at least a portion of the heating element being located within the electric grill;
a microprocessor in electronic communication with the triac, the microprocessor configured to deliver one of a plurality of discrete power levels to the heating element by activating or deactivating the triac;
at least one temperature sensing device configured to measure a sensed temperature at a position in the electric grill, the at least one temperature sensing device configured to electronically communicate the sensed temperature to the microprocessor, at least a portion of the at least one temperature sensing device being located within the electric grill;
a wireless controller in electronic communication with the microprocessor; and
a band controller in electronic communication with the microprocessor and the wireless controller, the band controller configured to receive a desired target temperature from the wireless controller, the band controller further configured to determine an upper temperature band and a lower temperature band, a range between the upper temperature band and the lower temperature band being based on the desired target temperature;

wherein the microprocessor is configured to cause delivery of a first discrete power level when the sensed temperature is below the lower temperature band, to cause delivery of a second discrete power level when the sensed temperature is between the lower temperature and the upper temperature band, and to cause delivery of a third discrete power level when the sensed temperature is above the upper temperature band, wherein the microprocessor, the wireless controller, and the band controller are located within the electric grill.

14. The wireless electric grill system of claim 13, wherein the first discrete power level is 100%, the second discrete power level is 50%, and the third discrete power level is 0%.

15. The wireless electric grill system of claim 13, further including a remote device in wireless communication with the microprocessor of the electric grill system using a radio frequency communication protocol, the remote device configured to receive a user input to select a type of food to be cooked and a desired doneness of the food to be cooked, and to wirelessly communicate an appropriate desired target temperature to the microprocessor of the electric grill system via the wireless controller.

16. The wireless electric grill system of claim 15, wherein the remote device includes a display and a user input device.

17. The wireless electric grill system of claim 16, wherein the display includes a touch screen, and the touch screen is configured to receive a user input representing one or more target temperatures, wherein the remote device is configured to wirelessly communicate the one or more target temperatures to the microprocessor of the electric grill system via the wireless controller.

18. The wireless electric grill system of claim 13, wherein the microprocessor of the electric grill system is configured to wirelessly transmit the sensed temperature to a remote device, and the remote device is configured to display the received sensed temperature on a touch screen of the remote device.

* * * * *